US011678055B2

(12) United States Patent
Kawanago et al.

(10) Patent No.: US 11,678,055 B2
(45) Date of Patent: Jun. 13, 2023

(54) IMAGING SUPPORT DEVICE, IMAGING SUPPORT SYSTEM, IMAGING SYSTEM, IMAGING SUPPORT METHOD, AND PROGRAM

(71) Applicant: FUJIFILM CORPORATION, Tokyo (JP)

(72) Inventors: Atsushi Kawanago, Saitama (JP); Junichi Tanaka, Saitama (JP); Shinichiro Fujiki, Saitama (JP); Tetsuya Fujikawa, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/659,170

(22) Filed: Apr. 13, 2022

(65) Prior Publication Data

US 2022/0239818 A1     Jul. 28, 2022

Related U.S. Application Data

(63) Continuation of application No. PCT/JP2020/039424, filed on Oct. 20, 2020.

(30) Foreign Application Priority Data

Oct. 29, 2019   (JP) .............................. JP2019-196680

(51) Int. Cl.
*H04N 23/68* (2023.01)
*G02B 27/64* (2006.01)
(Continued)

(52) U.S. Cl.
CPC ......... *H04N 23/685* (2023.01); *G02B 27/646* (2013.01); *H04N 23/632* (2023.01); *H04N 23/69* (2023.01)

(58) Field of Classification Search
CPC .... H04N 23/685; H04N 23/632; H04N 23/69; H04N 23/695; H04N 23/6812;
(Continued)

(56) References Cited

U.S. PATENT DOCUMENTS 5,835,641 A    11/1998 Sotoda et al.
2016/0336041 A1  11/2016 Mukai et al.
(Continued)

FOREIGN PATENT DOCUMENTS

JP    H06-217187 A    8/1994
JP    2015-037248 A   2/2015
(Continued)

OTHER PUBLICATIONS

International Search Report issued in International Application No. PCT/JP2020/039424 dated Jan. 12, 2021.
(Continued)

*Primary Examiner* — Gevell V Selby
(74) *Attorney, Agent, or Firm* — SOLARIS Intellectual Property Group, PLLC

(57) ABSTRACT

An imaging support device includes a detection portion that, by operating a revolution mechanism that causes an imaging apparatus including a variable magnification mechanism to revolve, detects a subject image position of a target subject image showing a target subject in a captured image obtained by capturing an imaging region including the target subject by the imaging apparatus, and a control portion that perform a registration control of setting the subject image position detected by the detection portion to a specific position in the captured image for a captured image obtained by imaging performed by the imaging apparatus in accordance with changing of magnification to a telephoto side by the variable magnification mechanism.

17 Claims, 17 Drawing Sheets

(51) Int. Cl.
*H04N 23/69* (2023.01)
*H04N 23/63* (2023.01)

(58) Field of Classification Search
CPC .... H04N 23/687; G02B 27/646; F16M 11/10;
F16M 11/18; F16M 11/2014; G03B 5/00;
G03B 15/00; G03B 17/00; G03B 17/56
See application file for complete search history.

(56) References Cited

U.S. PATENT DOCUMENTS

| | | | |
|---|---|---|---|
| 2017/0280045 A1* | 9/2017 | Nonaka | H04N 23/673 |
| 2020/0276011 A1* | 9/2020 | Akura | A61F 2/1624 |
| 2021/0266450 A1* | 8/2021 | Ito | H04N 23/661 |

FOREIGN PATENT DOCUMENTS

| | | |
|---|---|---|
| JP | 2015-130612 A | 7/2015 |
| JP | 2016-028539 A | 2/2016 |
| JP | 2019-102833 A | 6/2019 |

OTHER PUBLICATIONS

Written Opinion of the ISA issued in International Application No. PCT/JP2020/039424 dated Jan. 12, 2021.
International Preliminary Report on Patentability issued in International Application No. PCT/JP2020/039424 dated Jun. 15, 2021.

* cited by examiner

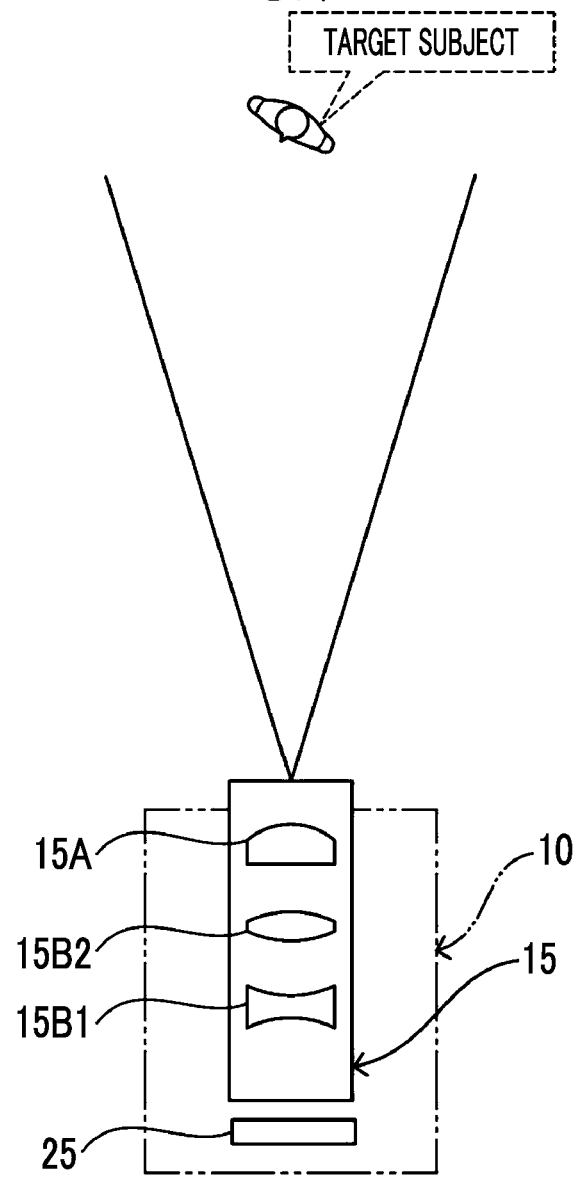

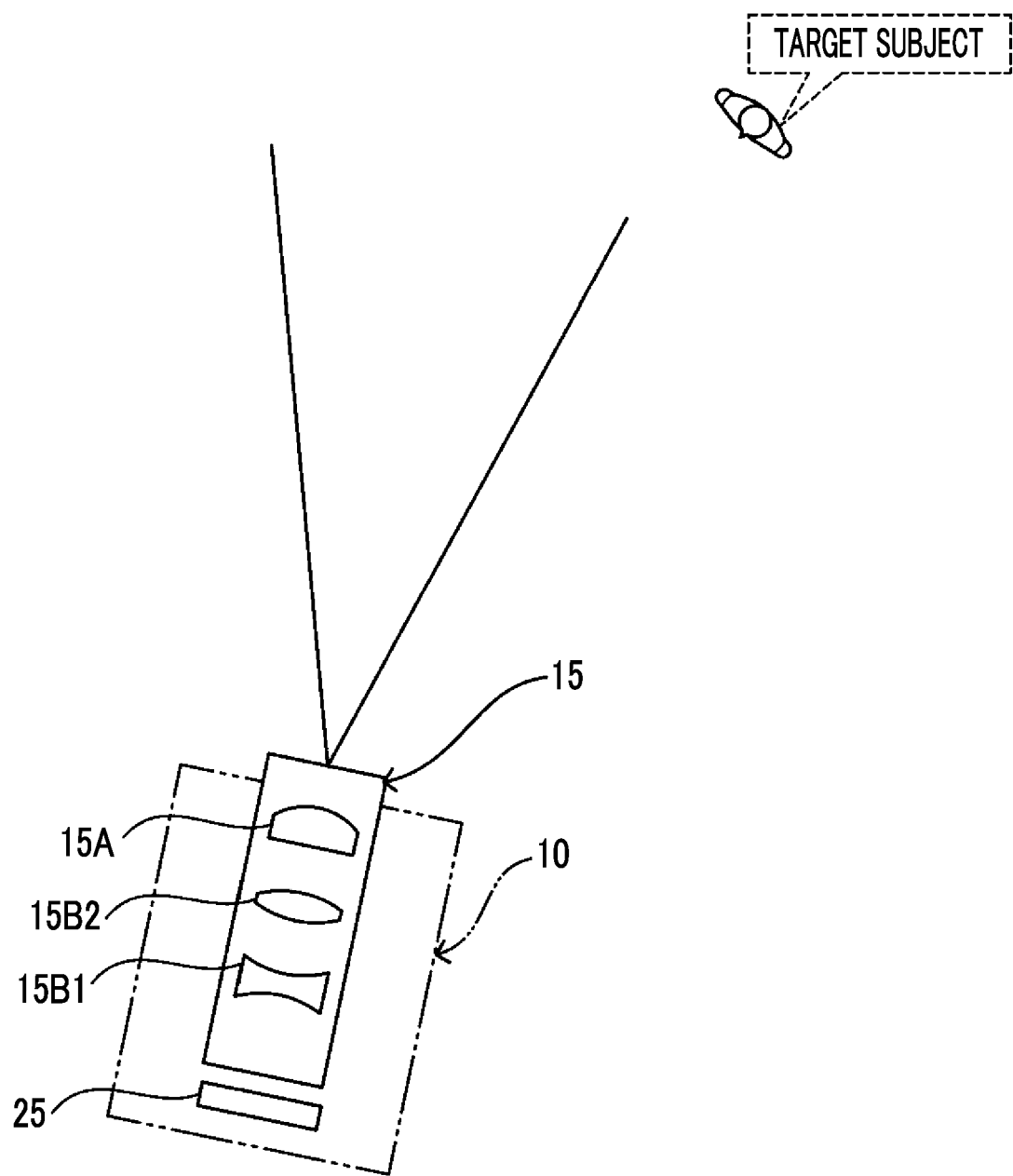

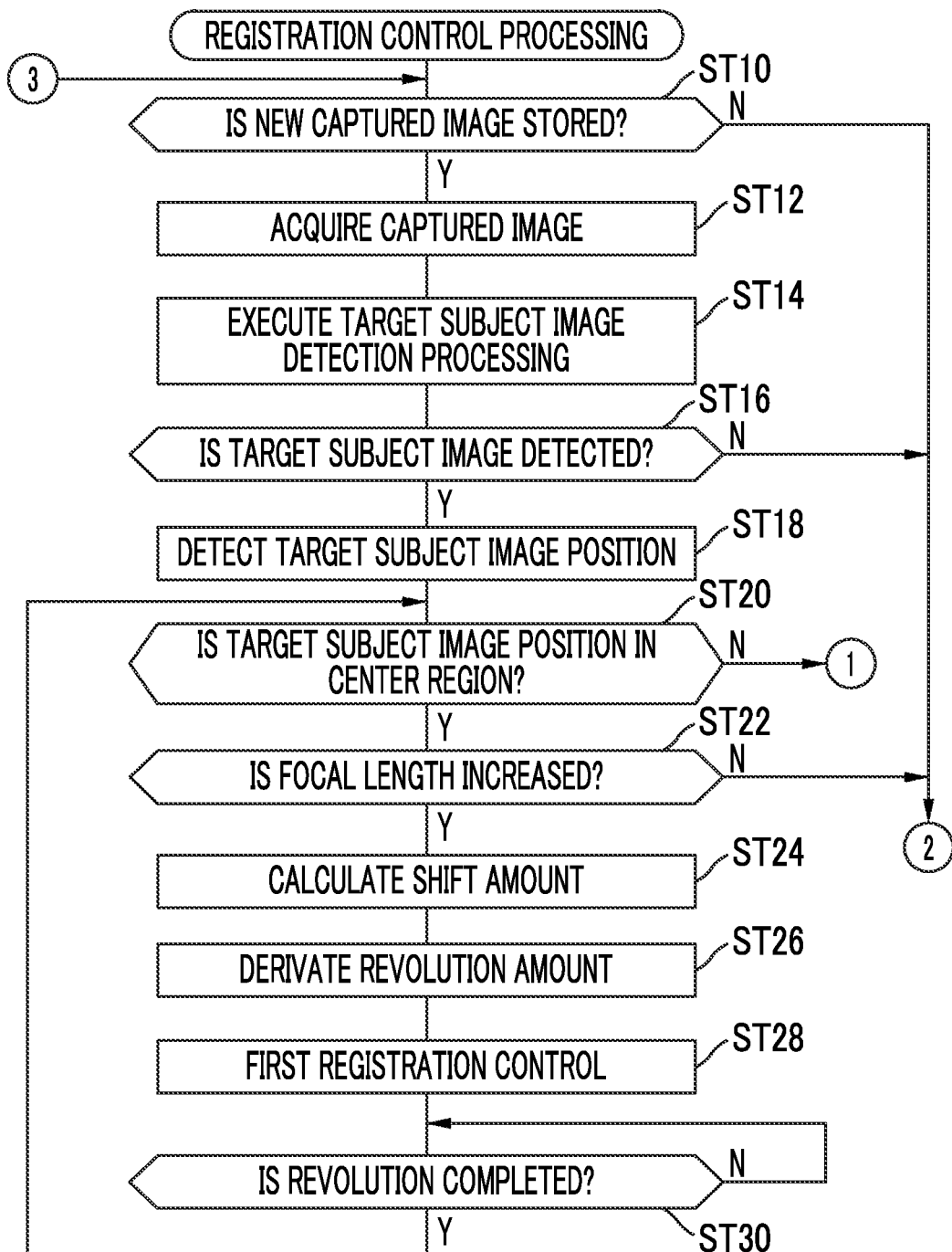

IMAGING SUPPORT DEVICE, IMAGING SUPPORT SYSTEM, IMAGING SYSTEM, IMAGING SUPPORT METHOD, AND PROGRAM

CROSS-REFERENCE TO RELATED APPLICATIONS

This application is a continuation application of International Application No. PCT/JP2020/039424, filed Oct. 20, 2020, the disclosure of which is incorporated herein by reference in its entirety. Further, this application claims priority from Japanese Patent Application No. 2019-196680, filed Oct. 29, 2019, the disclosure of which is incorporated herein by reference in its entirety.

BACKGROUND OF THE INVENTION

Field of the Invention

The disclosed technology relates to an imaging support device, an imaging support system, an imaging system, an imaging support method, and a program.

Description of the Related Art

JP2019-102833A discloses an imaging apparatus comprising a first driving unit, a second driving unit, and a control unit. The first driving unit rotates an imaging direction of an imaging unit to a first direction. The second driving unit rotates the imaging direction of the imaging unit to a second direction orthogonal to the first direction. The control unit executes a shake correction control of correcting an image shake that occurs due to a shake exerted on the imaging unit, by controlling the first driving unit or the second driving unit. The control unit switches the shake correction control using the first driving unit or the second driving unit in accordance with a rotation angle of the second driving unit.

JP2015-130612A discloses an imaging apparatus comprising an imaging unit, a correction member, a prediction unit, and a control unit. The imaging unit outputs a video signal by imaging a subject. The correction member executes first correction of correcting an image shake that occurs in a video related to the video signal due to a camera shake. The prediction unit predicts a movement direction of the subject. The control unit has a function of executing the first correction by driving the correction member and executes second correction of making a space in a direction in which the subject within an imaging angle of view moves, in accordance with the predicted movement direction of the subject by driving the correction member.

JP2015-037248A discloses an imaging apparatus including a shake correction unit, a subject detection unit, and a control unit. The subject detection unit detects a subject from an image. The control unit controls driving of the shake correction unit and also controls a zoom position. The control unit controls the driving of the shake correction unit in accordance with a position of the subject detected by the subject detection unit and, after the subject is included outside a first angle of view, controls the zoom position to move to a wide angle side.

SUMMARY OF THE INVENTION

One embodiment according to the disclosed technology provides an imaging support device, an imaging support system, an imaging system, an imaging support method, and a program that can set a subject image position to a specific position in a captured image even in a case where the subject image position is shifted with respect to the captured image by changing magnification to a telephoto side in an imaging apparatus including a variable magnification mechanism.

A first aspect according to the disclosed technology is an imaging support device comprising a detection portion that, by operating a revolution mechanism that causes an imaging apparatus including a variable magnification mechanism to revolve, detects a subject image position of a target subject image showing a target subject in a captured image obtained by capturing an imaging region including the target subject by the imaging apparatus, and a control portion that performs a registration control of setting the subject image position detected by the detection portion to a specific position in the captured image for a captured image obtained by imaging performed by the imaging apparatus in accordance with changing of magnification to a telephoto side by the variable magnification mechanism.

A second aspect according to the disclosed technology is the imaging support device according to the first aspect, in which the imaging apparatus includes a shake correction portion that corrects a shake occurring due to a vibration exerted on the imaging apparatus, and the registration control is a control including a control of setting the subject image position detected by the detection portion to the specific position by operating the shake correction portion.

A third aspect according to the disclosed technology is the imaging support device according to the first or second aspect, in which the registration control is a control including a control of setting the subject image position detected by the detection portion to the specific position by operating the revolution mechanism.

A fourth aspect according to the disclosed technology is the imaging support device according to the first aspect, in which the imaging apparatus includes a shake correction portion that corrects a shake occurring due to a vibration exerted on the imaging apparatus, and the control portion performs the registration control by operating at least one of the shake correction portion or the revolution mechanism in accordance with an offset amount of the subject image position detected by the detection portion with respect to the specific position.

A fifth aspect according to the disclosed technology is an imaging support device comprising a detection portion that, by operating a revolution mechanism that causes an imaging apparatus including a variable magnification mechanism and a shake correction portion which corrects a shake occurring due to an exerted vibration to revolve, detects a subject image position of a target subject image showing a target subject in a captured image obtained by capturing an imaging region including the target subject by the imaging apparatus, and a control portion that performs a registration control of setting the subject image position detected by the detection portion to a specific position in the captured image by operating at least one of the shake correction portion or the revolution mechanism in accordance with an offset amount of the subject image position detected by the detection portion with respect to the specific position, for the captured image obtained by imaging performed by the imaging apparatus in accordance with changing of magnification to a telephoto side by the variable magnification mechanism.

A sixth aspect according to the disclosed technology is the imaging support device according to the fourth or fifth aspect, in which the registration control includes a first registration control of moving the subject image position toward the specific position by operating the revolution mechanism and a second registration control of moving the subject image position toward the specific position by operating the shake correction portion with higher registration accuracy than the first registration control, and the control portion performs the first registration control and then, performs the second registration control.

A seventh aspect according to the disclosed technology is the imaging support device according to any one of the fourth to sixth aspects, in which the control portion, in a case where the subject image position deviates from the captured image by the changing of magnification to the telephoto side, moves the subject image position toward the specific position by operating the revolution mechanism and moves the subject image position toward the specific position by operating the shake correction portion.

An eighth aspect according to the disclosed technology is the imaging support device according to any one of the first to seventh aspects, in which the control portion performs the registration control in a case where at least a part of the target subject image deviates from the captured image by the changing of magnification to the telephoto side in a state where the target subject image is displayed in the captured image, and the specific position is a position decided as a position at which the target subject image falls within the captured image.

A ninth aspect according to the disclosed technology is the imaging support device according to any one of the first to eighth aspects, in which an offset amount of the subject image position from the specific position in the captured image is increased due to a relative decrease in registration accuracy for an imaging range in a revolution angle of the revolution mechanism in accordance with the changing of magnification to the telephoto side by the variable magnification mechanism.

A tenth aspect according to the disclosed technology is the imaging support device according to any one of the first to ninth aspects, in which the control portion performs the registration control by setting the specific position as a center position in the captured image.

An eleventh aspect according to the disclosed technology is the imaging support device according to the tenth aspect, in which variations in revolution angle of the revolution mechanism at a stoppage position in a case where the revolution of the imaging apparatus performed by the revolution mechanism is stopped are less than half of an angle of view of an imaging range on the telephoto side.

A twelfth aspect according to the disclosed technology is the imaging support device according to the eleventh aspect, in which the variations are less than the half of the angle of view and are less than an offset amount.

A thirteenth aspect according to the disclosed technology is an imaging support system comprising the imaging support device according to any one of the first to twelfth aspects, and the revolution mechanism, in which the imaging support device supports imaging performed by the imaging apparatus in a case where the revolution mechanism causes the imaging apparatus to revolve.

A fourteenth aspect according to the disclosed technology is an imaging system comprising the imaging support device according to any one of the first to thirteenth aspects, and the imaging apparatus, in which the imaging support device supports imaging for the imaging apparatus.

A fifteenth aspect according to the disclosed technology is the imaging system according to the fourteenth aspect, further comprising the revolution mechanism, in which the revolution mechanism causes the imaging apparatus to revolve.

A sixteenth aspect according to the disclosed technology is an imaging support method comprising detecting, by operating a revolution mechanism that causes an imaging apparatus including a variable magnification mechanism to revolve, a subject image position of a target subject image showing a target subject in a captured image obtained by capturing an imaging region including the target subject by the imaging apparatus, and performing a registration control of setting the detected subject image position to a specific position in the captured image for a captured image obtained by imaging performed by the imaging apparatus in accordance with changing of magnification to a telephoto side by the variable magnification mechanism.

A seventeenth aspect according to the disclosed technology is a program causing a computer to execute a process comprising detecting, by operating a revolution mechanism that causes an imaging apparatus including a variable magnification mechanism to revolve, a subject image position of a target subject image showing a target subject in a captured image obtained by capturing an imaging region including the target subject by the imaging apparatus, and performing a registration control of setting the detected subject image position to a specific position in the captured image for a captured image obtained by imaging performed by the imaging apparatus in accordance with changing of magnification to a telephoto side by the variable magnification mechanism.

BRIEF DESCRIPTION OF THE DRAWINGS

FIG. 7A is a conceptual diagram illustrating an example of an aspect in which a target subject is present in a center portion of an imaging region according to the first embodiment.

FIG. 8A is a conceptual diagram illustrating an example of an aspect in which the target subject deviates from the imaging region according to the first embodiment.

FIG. 9 is a conceptual diagram illustrating an example of the captured image in an imaging state.

FIG. 12A is a flowchart illustrating an example of a flow of registration control processing according to the first embodiment.

DESCRIPTION OF THE PREFERRED EMBODIMENTS

An example of an embodiment according to the disclosed technology will be described in accordance with the appended drawings.

First, words used in the following description will be described.

CPU is an abbreviation for "Central Processing Unit". RAM is an abbreviation for "Random Access Memory". ROM is an abbreviation for "Read Only Memory". ASIC is an abbreviation for "Application Specific Integrated Circuit". PLD is an abbreviation for "Programmable Logic Device". FPGA is an abbreviation for "Field-Programmable Gate Array". AFE is an abbreviation for "Analog Front End". DSP is an abbreviation for "Digital Signal Processor". ISP is an abbreviation for "Image Signal Processor". SoC is an abbreviation for "System-on-a-chip". CMOS is an abbreviation for "Complementary Metal Oxide Semiconductor". CCD is an abbreviation for "Charge Coupled Device". SWIR is an abbreviation for "Short-Wavelength Infrared".

SSD is an abbreviation for "Solid State Drive". USB is an abbreviation for "Universal Serial Bus". HDD is an abbreviation for "Hard Disk Drive". EEPROM is an abbreviation for "Electrically Erasable and Programmable Read Only Memory". EL is an abbreviation for "Electro-Luminescence". A/D is an abbreviation for "Analog/Digital". I/F is an abbreviation for "Interface". UI is an abbreviation for "User Interface". WAN is an abbreviation for "Wide Area Network". CRT is an abbreviation for "Cathode Ray Tube". OIS is an abbreviation for "Optical Image Stabilizer". BIS is an abbreviation for "Body Image Stabilizer".

In the description of the present specification, "horizontal" refers to being horizontal in a sense of not only being completely horizontal but also including an error generally allowed in the technical field to which the disclosed technology belongs. In the description of the present specification, "parallel" refers to being parallel in a sense of not only being completely parallel but also including an error generally allowed in the technical field to which the disclosed technology belongs. In the description of the present specification, "perpendicular" refers to being perpendicular in a sense of not only being completely perpendicular but also including an error generally allowed in the technical field to which the disclosed technology belongs. In the description of the present specification, "same" refers to being the same in a sense of not only being completely the same but also including an error generally allowed in the technical field to which the disclosed technology belongs.

First Embodiment

Figure 1:
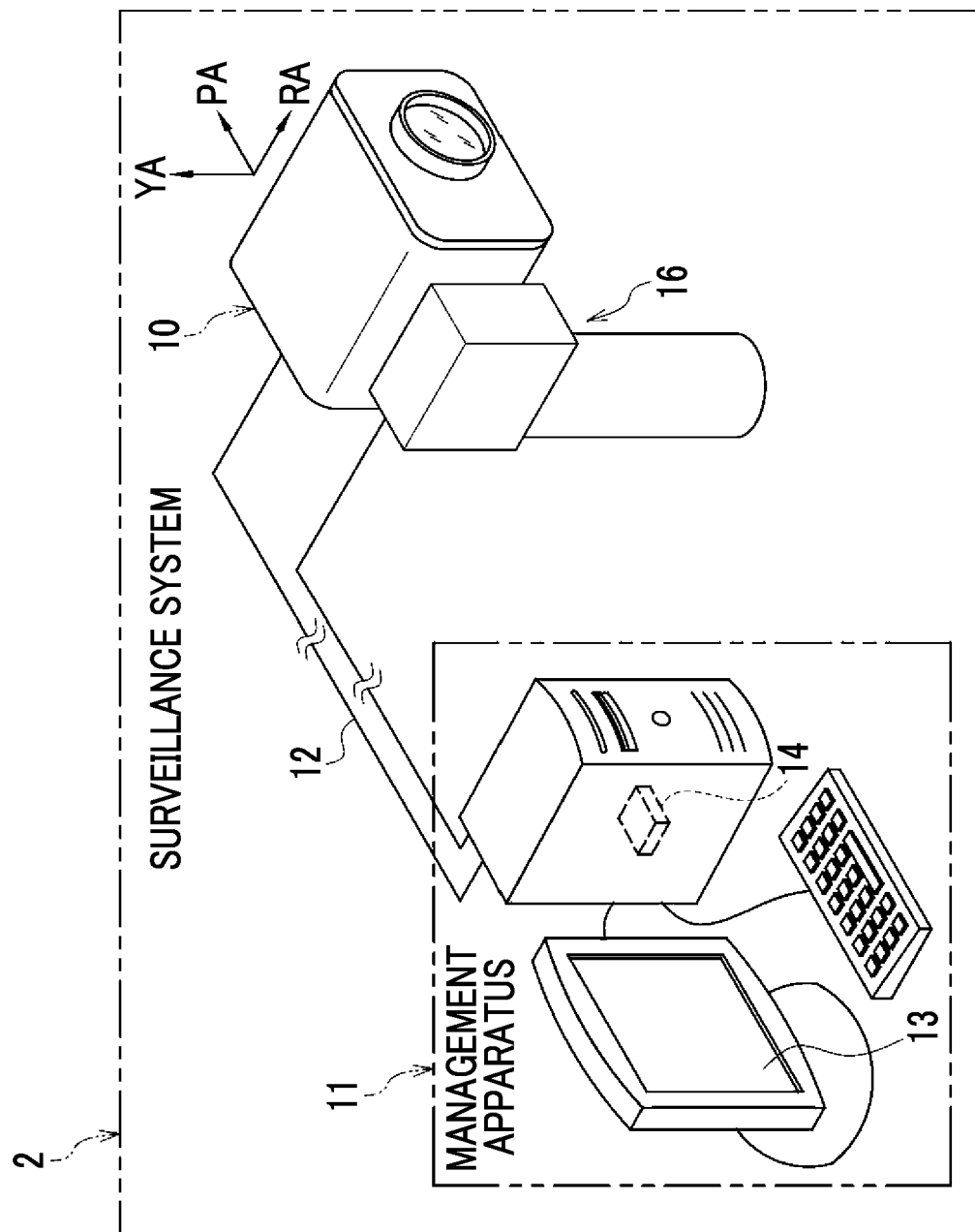
FIG. 1 is a schematic configuration diagram illustrating an example of a configuration of a surveillance system according to a first embodiment.

As illustrated in FIG. 1 as an example, a surveillance system 2 comprises a surveillance camera 10, a management apparatus 11, and a revolution mechanism 16. The surveillance system 2 is an example of an "imaging system" or an "imaging support system" according to the embodiment of the disclosed technology. The surveillance camera 10 is an example of an "imaging apparatus" according to the embodiment of the disclosed technology.

The surveillance camera 10 is installed in an indoor or outdoor post or wall, a part (for example, a rooftop) of a building, or the like through a revolution mechanism 16, described later, images a surveillance target that is a subject, and generates a motion picture image by the imaging. The motion picture image includes images of a plurality of frames obtained by imaging. The surveillance camera 10 transmits the motion picture image obtained by imaging to the management apparatus 11 through a communication line 12.

The management apparatus 11 comprises a display 13 and a secondary storage device 14. Examples of the display 13 include a liquid crystal display, a plasma display, an organic EL display, and a CRT display.

Examples of the secondary storage device 14 include an HDD. The secondary storage device 14 may be a non-volatile memory such as a flash memory, an SSD, or an EEPROM instead of the HDD.

In the management apparatus 11, the motion picture image transmitted by the surveillance camera 10 is received, and the received motion picture image is displayed on the display 13 or stored in the secondary storage device 14.

Figure 2:
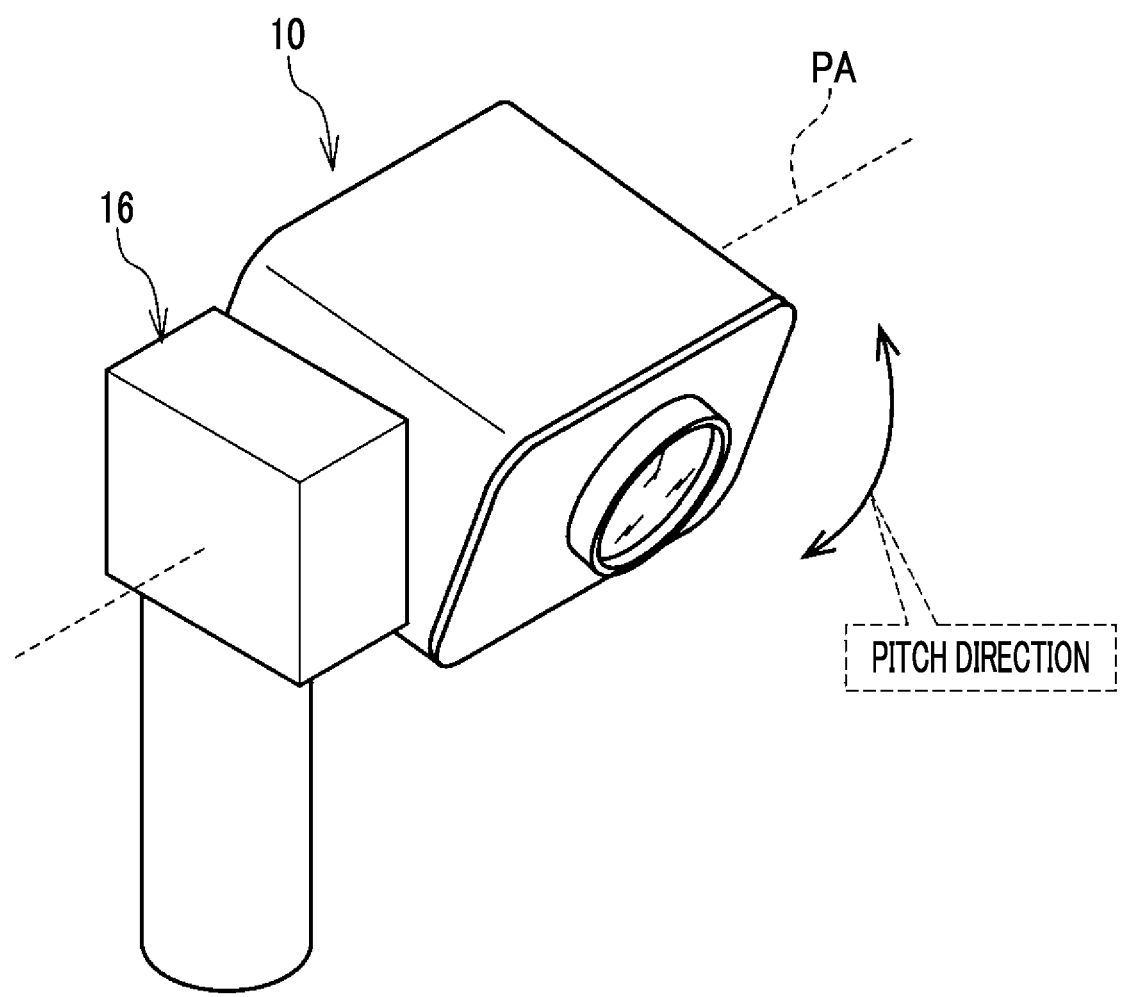
FIG. 2 is a perspective view illustrating an example of an exterior of a surveillance camera according to the first embodiment.
Figure 3:
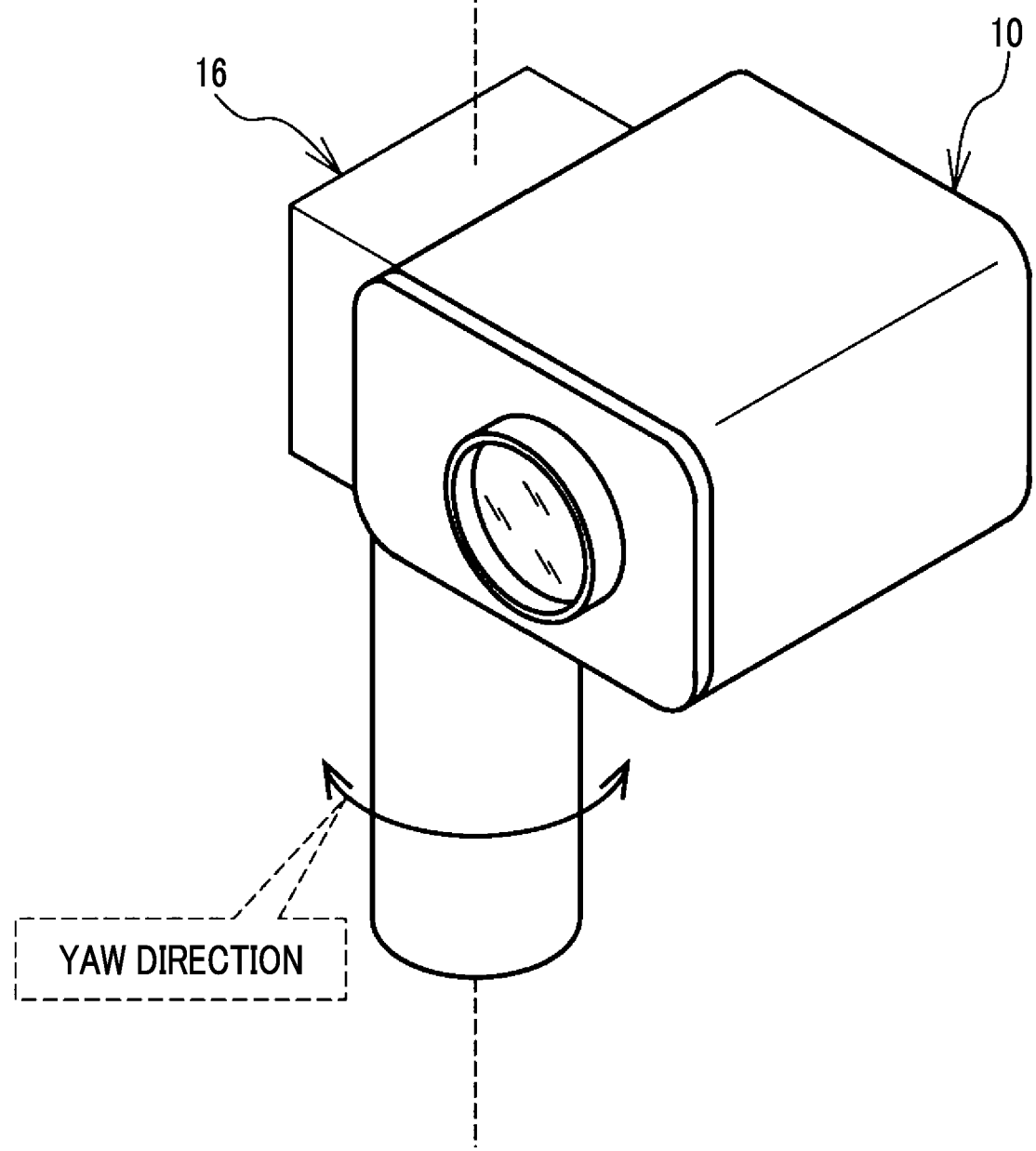
FIG. 3 is a perspective view illustrating an example of the exterior of the surveillance camera according to the first embodiment.

The surveillance camera 10 is attached to the revolution mechanism 16. The revolution mechanism 16 enables the surveillance camera 10 to revolve. Specifically, the revolution mechanism 16 is a 2-axis revolution mechanism that enables the surveillance camera 10 to revolve in a revolution direction (hereinafter, referred to as a "pitch direction") that intersects with a yaw direction and is about a pitch axis PA as a central axis as illustrated in FIG. 2 as an example, and a revolution direction (hereinafter, referred to as the "yaw direction") about a yaw axis YA as a central axis as illustrated in FIG. 3 as an example. The revolution mechanism 16 is an example of a "revolution mechanism" according to the embodiment of the disclosed technology. While an example of the 2-axis revolution mechanism is illustrated for the revolution mechanism 16 according to the present embodiment, the disclosed technology is not limited thereto, and a 3-axis revolution mechanism may be used.

Figure 4:
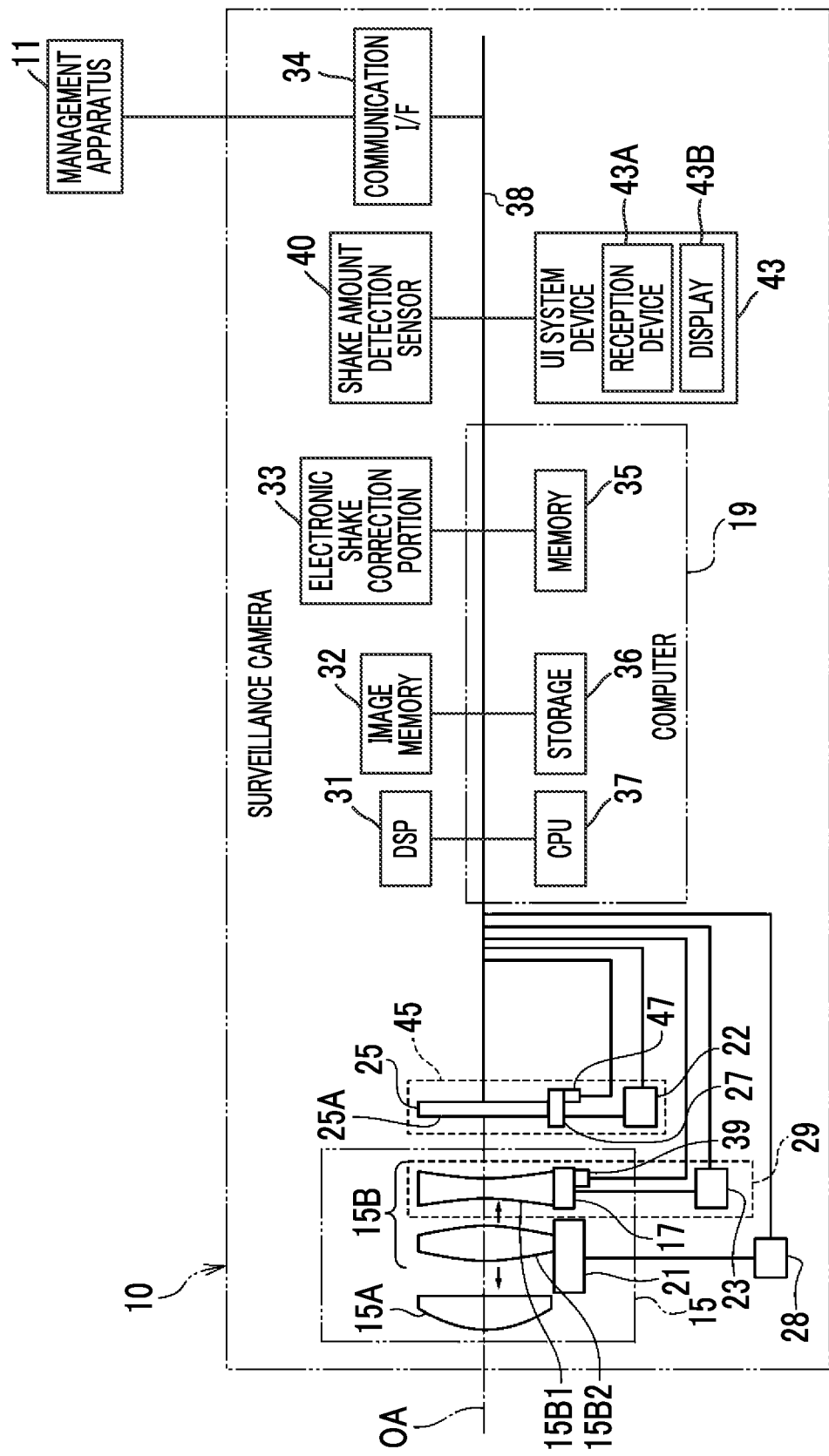
FIG. 4 is a block diagram illustrating an example of a configuration of an optical system and an electric system of the surveillance camera according to the first embodiment.

As illustrated in FIG. 4 as an example, the surveillance camera 10 comprises an optical system 15 and an imaging element 25. The imaging element 25 is positioned on a rear stage of the optical system 15. The optical system 15 comprises an objective lens 15A and a lens group 15B. The objective lens 15A and the lens group 15B are arranged in an order of the objective lens 15A and the lens group 15B along an optical axis OA of the optical system 15 from a target subject side (object side) to a light-receiving surface 25A side (image side) of the imaging element 25. The lens group 15B includes an anti-vibration lens 15B1, a focus lens (not illustrated), a zoom lens 15B2, and the like. The zoom lens 15B2 is movably supported along the optical axis OA by a lens actuator 21, described later. The anti-vibration lens 15B1 is movably supported in a direction orthogonal to the optical axis OA by a lens actuator 17, described later.

In such a manner, the surveillance camera 10 comprises the zoom lens 15B2 and is an example of an imaging apparatus including a variable magnification mechanism capable of changing a focal length. Increasing the focal length sets the surveillance camera 10 on a telephoto side. Thus, an angle of view is decreased (imaging range is narrowed). Decreasing the focal length sets a wide angle side. Thus, the angle of view is increased (imaging range is widened). The diagram of the variable magnification mechanism illustrated in the embodiment of the disclosed technology is merely a conceptual diagram. The variable magnification mechanism may employ various configurations.

Various lenses, not illustrated, may be comprised as the optical system 15 in addition to the objective lens 15A and the lens group 15B. Furthermore, the optical system 15 may comprise a stop. Positions of the lenses, the lens group, and the stop included in the optical system 15 are not limited. For example, the disclosed technology is also established for positions different from the positions illustrated in FIG. 4.

The anti-vibration lens 15B1 is movable in a direction perpendicular to the optical axis OA, and the zoom lens 15B2 is movable along the optical axis OA.

The optical system 15 comprises the lens actuators 17 and 21. The lens actuator 17 exerts force to the anti-vibration lens 15B1 to change in a direction perpendicular to an optical axis of the anti-vibration lens 15B1. The lens actuator 17 is controlled by an OIS driver 23. Driving the lens actuator 17 under control of the OIS driver 23 changes the position of the anti-vibration lens 15B1 in the direction perpendicular to the optical axis OA.

The lens actuator 21 exerts force to the zoom lens 15B2 to move along the optical axis OA of the optical system 15. The lens actuator 21 is controlled by a lens driver 28. Driving the lens actuator 21 under control of the lens driver 28 moves the position of the zoom lens 15B2 along the optical axis OA. The movement of the position of the zoom lens 15B2 along the optical axis OA changes the focal length of the surveillance camera 10.

In a case where, for example, contours of the captured image have an oblong shape having short edges in a direction of the pitch axis PA and having long edges in a direction of the yaw axis YA, the angle of view in the direction of the pitch axis PA is narrower than the angle of view in the direction of the yaw axis YA and is narrower than the angle of view along a diagonal line.

Variations caused by repeating revolution may occur in a revolution amount, that is, a revolution angle (hereinafter, referred to as the "revolution amount"), of the revolution mechanism 16 due to a tolerance or the like of each component of the revolution mechanism 16. That is, even in a case of trying to operate the revolution mechanism 16 by setting a constant revolution amount, for example, 1 degree (60 minutes) in angular measure, there may be cases and the like such that a revolution angle of 57 minutes occurs in a certain case, and a revolution angle of 63 minutes occurs in another case. Here, in the present embodiment, the variations in revolution angle of the revolution mechanism 16 are adjusted to less than half of the angle of view on the telephoto side of the surveillance camera 10. Specifically, the variations in revolution angle at a stoppage position in a case where revolution of the revolution mechanism 16 stops are adjusted to less than the half of the angle of view on the telephoto side. For example, as described above, in a case where the contours of the captured image have an oblong shape having short edges in the direction of the pitch axis PA and having long edges in the direction of the yaw axis YA, the variations in revolution angle at the stoppage position in a case where the revolution of the revolution mechanism 16 stops are adjusted to less than the half of the angle of view in the direction of the pitch axis PA (short edge direction). Furthermore, the variations in revolution angle of the revolution mechanism 16 are adjusted to less than an offset amount, described later.

In such a manner, the variations in revolution angle at the stoppage position in a case where the revolution of the revolution mechanism 16 stops are adjusted to less than the half of the angle of view on the telephoto side, and the variations in revolution angle of the revolution mechanism 16 are adjusted to less than the offset amount. Accordingly, in registration control processing, described later, a position of a target subject image (hereinafter, referred to as a "subject image position") in the captured image can be set to a center region in the captured image. Here, the captured image refers to an image obtained by capturing an imaging region by the surveillance camera 10. In addition, the target subject image refers to an image showing a target subject in the captured image obtained by capturing the imaging region including the target subject by the surveillance camera 10. The center region is an example of a "center position" according to the embodiment of the disclosed technology.

By the optical system 15 configured in such a manner, an image of light showing the imaging region is formed on the light-receiving surface 25A of the imaging element 25, and the imaging region is captured by the imaging element 25.

Examples of a vibration exerted on the surveillance camera 10 include, in a case of an outdoor space, a vibration caused by traffic of an automobile, a vibration caused by wind, a vibration caused by construction work, and the like and, in a case of an indoor space, a vibration caused by an operation of an air conditioner, a vibration caused by entrance and exit of a person, and the like. Thus, in the surveillance camera 10, a shake occurs due to the vibration exerted on the surveillance camera 10 (hereinafter, simply referred to as the "vibration").

In the present embodiment, the "shake" refers to a phenomenon in which the target subject image on the light-receiving surface 25A of the imaging element 25 changes due to a change in positional relationship between the optical axis OA and the light-receiving surface 25A in the surveillance camera 10. In other words, the "shake" is said to be a phenomenon in which an optical image obtained by forming the image on the light-receiving surface 25A changes by inclination of the optical axis OA due to the vibration exerted on the surveillance camera 10. For example, changing of the optical axis OA means inclination of the optical axis OA with respect to a reference axis (for example, the optical axis OA before the shake occurs). Hereinafter, the shake that occurs due to the vibration will be simply referred to as the "shake".

The shake is included in the captured image as a noise component and affects image quality of the captured image. Therefore, in order to remove the noise component included in the captured image due to the shake, the surveillance camera 10 comprises a lens side shake correction mechanism 29, an imaging element side shake correction mechanism 45, and an electronic shake correction portion 33 that are used for correcting the shake. Each of the lens side shake correction mechanism 29, the imaging element side shake correction mechanism 45, and the electronic shake correction portion 33 is an example of a "shake correction portion (shake correction component)" according to the embodiment of the disclosed technology. The lens side shake correction mechanism 29 and the imaging element side shake correction mechanism 45 are mechanical shake correction mechanisms. The mechanical shake correction mechanisms are mechanisms that correct the shake by applying motive power generated by a driving source such as a motor (for example, a voice coil motor) to a shake correction element (for example, the anti-vibration lens and/or the imaging element) to move the shake correction element in a direction perpendicular to an optical axis of an imaging optical system. Specifically, the lens side shake correction mechanism 29 is a mechanism that corrects the shake by applying motive power generated by a driving source such as a motor (for example, a voice coil motor) to the anti-vibration lens to move the anti-vibration lens in the direction perpendicular to the optical axis of the imaging optical system. The imaging element side shake correction mechanism 45 is a mechanism that corrects the shake by applying motive power generated by a driving source such as a motor (for example, a voice coil motor) to the imaging element to move the imaging element in the direction perpendicular to the optical axis of the imaging optical system. The electronic shake correction portion 33 corrects the shake by performing image processing on a captured image based on a shake amount. That is, the shake correction portion (shake correction component) mechanically or electronically corrects the shake using a hardware configuration and/or a software configuration. Here, mechanical correction of the shake refers to correction of the shake implemented by mechanically moving a shake correction element such as an anti-vibration lens and/or an imaging element using motive power generated by a driving source such as a motor (for example, a voice coil motor). Electronic correction of the shake refers to correction of the shake implemented by performing the image processing by a processor. In addition, in the present embodiment, "correction of the shake" includes a meaning of removing the shake and also a meaning of reducing the shake.

As illustrated in FIG. 4 as an example, the lens side shake correction mechanism 29 comprises the anti-vibration lens 15B1, the lens actuator 17, the OIS driver 23, and a position detection sensor 39.

Various well-known methods can be employed as a method of correcting the shake by the lens side shake correction mechanism 29. In the present embodiment, a method of correcting the shake by moving the anti-vibration lens 15B1 based on the shake amount detected by a shake amount detection sensor 40 (described later) is employed as the method of correcting the shake. Specifically, the shake is corrected by moving the anti-vibration lens 15B1 in a direction of canceling the shake by an amount with which the shake is canceled.

The lens actuator 17 is attached to the anti-vibration lens 15B1. The lens actuator 17 is a shift mechanism in which a voice coil motor is mounted, and changes the anti-vibration lens 15B1 in the direction perpendicular to the optical axis of the anti-vibration lens 15B1 by driving the voice coil motor. Here, while the shift mechanism in which the voice coil motor is mounted is employed as the lens actuator 17, the disclosed technology is not limited thereto. Other motive power sources such as a stepping motor or a piezo element may be applied instead of the voice coil motor.

The lens actuator 17 is controlled by the OIS driver 23. Driving the lens actuator 17 under control of the OIS driver 23 mechanically changes the position of the anti-vibration lens 15B1 in a two-dimensional plane perpendicular to the optical axis OA.

The position detection sensor 39 detects the current position of the anti-vibration lens 15B1 and outputs a position signal indicating the detected current position. Here, a device including a hall element is employed as an example of the position detection sensor 39. Here, the current position of the anti-vibration lens 15B1 refers to the current position in a two-dimensional plane of the anti-vibration lens. The two-dimensional plane of the anti-vibration lens refers to a two-dimensional plane perpendicular to the optical axis of the anti-vibration lens 15B1. In the present embodiment, while the device including the hall element is employed as an example of the position detection sensor 39, the disclosed technology is not limited thereto. A magnetic sensor, a photosensor, or the like may be employed instead of the hall element.

The lens side shake correction mechanism 29 corrects the shake by moving the anti-vibration lens 15B1 along at least one of the direction of the pitch axis PA or the direction of the yaw axis YA within an actually imaged range. That is, the lens side shake correction mechanism 29 corrects the shake by moving the anti-vibration lens 15B1 by a movement amount corresponding to the shake amount in the two-dimensional plane of the anti-vibration lens.

In addition, in the present embodiment, the lens side shake correction mechanism 29 moves the subject image position to the center region in the captured image by executing the registration control processing, described later. The "center region" is a region that includes a center of the captured image and in which four edges of the center region are spaced from the four edges of the contours of the captured image. In a state where the target subject image is present in the center region, the target subject image is generally likely to be visible to a user or the like compared to a state where the target subject image is present in other than the center region.

The imaging element side shake correction mechanism 45 comprises the imaging element 25, a BIS driver 22, an imaging element actuator 27, and a position detection sensor 47.

In the same manner as the method of correcting the shake by the lens side shake correction mechanism 29, various well-known methods can be employed as a method of correcting the shake by the imaging element side shake correction mechanism 45. In the present embodiment, a method of correcting the shake by moving the imaging element 25 based on the shake amount detected by the shake amount detection sensor 40 is employed as the method of correcting the shake. Specifically, the shake is corrected by moving the imaging element 25 in the direction of canceling the shake by the amount with which the shake is canceled.

The imaging element actuator 27 is attached to the imaging element 25. The imaging element actuator 27 is a shift mechanism in which a voice coil motor is mounted, and changes the imaging element 25 in the direction perpendicular to the optical axis of the anti-vibration lens 15B1 by driving the voice coil motor. Here, while the shift mechanism in which the voice coil motor is mounted is employed as the imaging element actuator 27, the disclosed technology is not limited thereto. Other motive power sources such as a stepping motor or a piezo element may be applied instead of the voice coil motor.

The imaging element actuator 27 is controlled by the BIS driver 22. Driving the imaging element actuator 27 under control of the BIS driver 22 mechanically changes a position of the imaging element 25 in the direction perpendicular to the optical axis OA.

The position detection sensor 47 detects the current position of the imaging element 25 and outputs a position signal indicating the detected current position. Here, a device including a hall element is employed as an example of the position detection sensor 47. Here, the current position of the imaging element 25 refers to the current position in a two-dimensional plane of the imaging element. The two-dimensional plane of the imaging element refers to a two-dimensional plane perpendicular to the optical axis of the anti-vibration lens 15B1. In the present embodiment, while the device including the hall element is employed as an example of the position detection sensor 47, the disclosed technology is not limited thereto. A magnetic sensor, a photosensor, or the like may be employed instead of the hall element.

The surveillance camera 10 comprises a computer 19, a DSP 31, an image memory 32, the electronic shake correction portion 33, a communication I/F 34, the shake amount detection sensor 40, and a UI system device 43. The computer 19 comprises a memory 35, a storage 36, and a CPU 37. The computer 19 is an example of a "computer" according to the embodiment of the disclosed technology. In addition, the electronic shake correction portion 33 and a control portion 37H (refer to FIG. 6), described later, are an example of an "electronic shake correction portion" according to the embodiment of the disclosed technology. In the present embodiment, the CPU 37 operates as the control portion 37H.

The imaging element 25, the DSP 31, the image memory 32, the electronic shake correction portion 33, the communication I/F 34, the memory 35, the storage 36, the CPU 37, the shake amount detection sensor 40, and the UI system device 43 are connected to a bus 38. In addition, the OIS driver 23 is connected to the bus 38. In the example illustrated in FIG. 4, while one bus is illustrated as the bus 38 for convenience of illustration, a plurality of buses may be used. The bus 38 may be a serial bus or may be a parallel bus including a data bus, an address bus, a control bus, and the like.

The memory 35 temporarily stores various information and is used as a work memory. Examples of the memory 35 include a RAM. However, the disclosed technology is not limited thereto. A storage device of other types may be used. The storage 36 stores various programs for the surveillance camera 10. The CPU 37 controls the entire surveillance camera 10 by reading out various programs from the storage 36 and executing the read various programs on the memory 35. Examples of the storage 36 include a flash memory, an SSD, an EEPROM, or an HDD. In addition, for example, various non-volatile memories such as a magnetoresistive memory and a ferroelectric memory may be used instead of the flash memory or together with the flash memory.

The imaging element 25 is a CMOS image sensor. The imaging element 25 images the target subject at a predetermined frame rate under an instruction of the CPU 37. Here, for example, the "predetermined frame rate" refers to a few tens of frames/second to a few hundred frames/second. The imaging element 25 may incorporate a control device (imaging element control device). In this case, the imaging element control device performs detailed controls inside imaging element 25 in accordance with an imaging instruction output by the CPU 37. In addition, the imaging element 25 may image a target subject at the predetermined frame rate under an instruction of the DSP 31. In this case, the imaging element control device performs the detailed controls inside the imaging element 25 in accordance with the imaging instruction output by the DSP 31. The DSP 31 may be referred to as an ISP.

The light-receiving surface 25A of the imaging element 25 is formed with a plurality of photosensitive pixels (not illustrated) arranged in a matrix. In the imaging element 25, photoelectric conversion is performed for each photosensitive pixel by exposing each photosensitive pixel. Charges obtained by performing the photoelectric conversion for each photosensitive pixel correspond to an analog imaging signal indicating the target subject. Here, a plurality of photoelectric conversion elements (for example, photoelectric conversion elements in which color filters are arranged) having sensitivity to visible light are employed as the plurality of photosensitive pixels. In the imaging element 25, a photoelectric conversion element having sensitivity to light of red (R) (for example, a photoelectric conversion element in which an R filter corresponding to R is arranged), a photoelectric conversion element having sensitivity to light of green (G) (for example, a photoelectric conversion element in which a G filter corresponding to G is arranged), and a photoelectric conversion element having sensitivity to light of blue (B) (for example, a photoelectric conversion element in which a B filter corresponding to B is arranged) are employed as the plurality of photoelectric conversion elements. In the surveillance camera 10, imaging based on the visible light (for example, light on a short wavelength side of less than or equal to approximately 700 nanometers) is performed using these photosensitive pixels. However, the present embodiment is not limited thereto. Imaging based on infrared light (for example, light on a long wavelength side of greater than approximately 700 nanometers) may be performed. In this case, a plurality of photoelectric conversion elements having sensitivity to the infrared light may be used as the plurality of photosensitive pixels. Particularly, for example, an InGaAs sensor and/or a type-2 quantum well (T2SL; Simulation of Type-II Quantum Well) sensor may be used for imaging for SWIR.

The imaging element 25 generates a digital image that is a digital imaging signal by performing signal processing such as A/D conversion on the analog imaging signal. The imaging element 25 is connected to the DSP 31 through the bus 38 and outputs the generated digital image to the DSP 31 in units of frames through the bus 38. Here, the digital image is an example of a "captured image" according to the embodiment of the disclosed technology.

Here, while the CMOS image sensor is illustratively described as an example of the imaging element 25, the disclosed technology is not limited thereto. A CCD image sensor may be applied as the imaging element 25. In this case, the imaging element 25 is connected to the bus 38 through an AFE (not illustrated) that incorporates a CCD driver. The AFE generates the digital image by performing the signal processing such as the A/D conversion on the analog imaging signal obtained by the imaging element 25 and outputs the generated digital image to the DSP 31. The CCD image sensor is driven by the CCD driver incorporated in the AFE. The CCD driver may be independently provided.

The DSP 31 performs various digital signal processing on the digital image. For example, the various digital signal processing refers to demosaicing, noise removal processing, gradation correction processing, and color correction processing.

The DSP 31 outputs the digital image after the digital signal processing to the image memory 32 for each frame. The image memory 32 stores the digital image from the DSP 31. Hereinafter, for convenience of description, the digital image stored in the image memory 32 will be referred to as the "captured image".

The shake amount detection sensor 40 is, for example, a device including a gyro sensor and detects the shake amount of the surveillance camera 10. In other words, the shake amount detection sensor 40 detects the shake amount for each of a pair of axial directions. The gyro sensor detects an amount of a rotational shake about each axis (refer to FIG. 1) of the pitch axis PA, the yaw axis YA, and a roll axis RA (axis parallel to the optical axis OA). The shake amount detection sensor 40 detects the shake amount of the surveillance camera 10 by converting the amount of the rotational shake about the pitch axis PA and the amount of the rotational shake about the yaw axis YA detected by the gyro sensor into a shake amount in a two-dimensional plane parallel to the pitch axis PA and the yaw axis YA.

Here, while the gyro sensor is illustrated as an example of the shake amount detection sensor 40, this is merely an example. The shake amount detection sensor 40 may be an acceleration sensor. The acceleration sensor detects the shake amount in the two-dimensional plane parallel to the pitch axis PA and the yaw axis YA. The shake amount detection sensor 40 outputs the detected shake amount to the CPU 37.

In addition, here, while an example of a form of detecting the shake amount by the shake amount detection sensor 40 that is a physical sensor is illustrated, the disclosed technology is not limited thereto. For example, a movement vector obtained by comparing captured images that are stored in the image memory 32 and are adjacent to each other in time series may be used as the shake amount. In addition, a finally used shake amount may be derived based on the shake amount detected by the physical sensor and the movement vector obtained by the image processing.

The CPU 37 acquires the shake amount detected by the shake amount detection sensor 40 and controls the lens side shake correction mechanism 29, the imaging element side shake correction mechanism 45, and the electronic shake correction portion 33 based on the acquired shake amount. The shake amount detected by the shake amount detection sensor 40 is used for correction of the shake by each of the lens side shake correction mechanism 29 and the electronic shake correction portion 33.

The electronic shake correction portion 33 is a device including an ASIC. The electronic shake correction portion 33 corrects the shake by performing the image processing on the captured image in the image memory 32 based on the shake amount detected by the shake amount detection sensor 40.

Here, while the device including the ASIC is illustrated as the electronic shake correction portion 33, the disclosed technology is not limited thereto. For example, a device including an FPGA or a PLD may be used. In addition, for example, the electronic shake correction portion 33 may be a device including a plurality out of the ASIC, the FPGA, and the PLD. In addition, a computer including a CPU, a storage, and a memory may be employed as the electronic shake correction portion 33. The number of CPUs may be singular or plural. In addition, the electronic shake correction portion 33 may be implemented by a combination of a hardware configuration and a software configuration.

The communication I/F 34 is, for example, a network interface and controls transfer of various information with respect to the management apparatus 11 through a network. Examples of the network include a WAN such as the Internet or a public communication network. Communication between the surveillance camera 10 and the management apparatus 11 is controlled.

The UI system device 43 comprises a reception device 43A and a display 43B. The reception device 43A includes, for example, a hard key and a touch panel and receives various instructions from the user. The CPU 37 acquires the various instructions received by the reception device 43A and operates in accordance with the acquired instructions.

The display 43B displays various information under control of the CPU 37. Examples of the various information displayed on the display 43B include contents of the various instructions received by the reception device 43A and the captured image.

Figure 5:
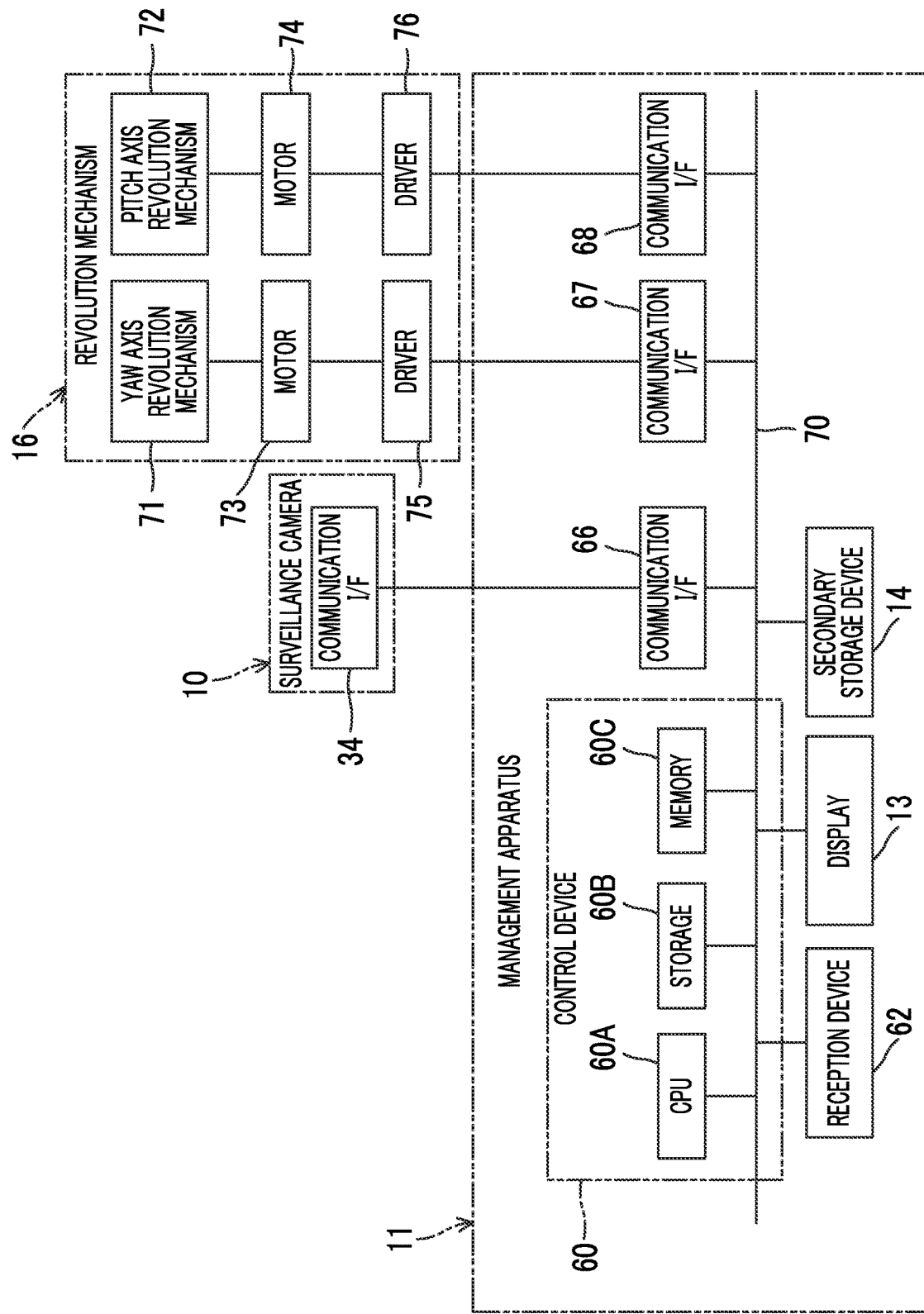
FIG. 5 is a block diagram illustrating an example of a configuration of an electric system of a management apparatus and a revolution mechanism according to the first embodiment.

As illustrated in FIG. 5 as an example, the revolution mechanism 16 comprises a yaw axis revolution mechanism 71, a pitch axis revolution mechanism 72, a motor 73, a motor 74, a driver 75, and a driver 76. The yaw axis revolution mechanism 71 causes the surveillance camera 10 to revolve in the yaw direction. The motor 73 is driven to generate motive power under control of the driver 75. The yaw axis revolution mechanism 71 causes the surveillance camera 10 to revolve in the yaw direction by receiving the motive power generated by the motor 73. The pitch axis revolution mechanism 72 causes the surveillance camera 10 to revolve in the pitch direction. The motor 74 is driven to generate motive power under control of the driver 76. The pitch axis revolution mechanism 72 causes the surveillance camera 10 to revolve in the pitch direction by receiving the motive power generated by the motor 74.

As illustrated in FIG. 5 as an example, the management apparatus 11 comprises the display 13, a control device 60, a reception device 62, and a communication I/F 66. The control device 60 comprises a CPU 60A, a storage 60B, and a memory 60C. Each of the reception device 62, the display 13, the secondary storage device 14, the CPU 60A, the storage 60B, the memory 60C, and the communication I/F 66 is connected to a bus 70. In the example illustrated in FIG. 5, while one bus is illustrated as the bus 70 for convenience of illustration, a plurality of buses may be used. The bus 70 may be a serial bus or may be a parallel bus including a data bus, an address bus, a control bus, and the like.

The memory 60C temporarily stores various information and is used as a work memory. Examples of the memory 60C include a RAM. However, the disclosed technology is not limited thereto. A storage device of other types may be used. The storage 60B stores various programs for the management apparatus 11 (hereinafter, simply referred to as a "management apparatus program"). The CPU 60A controls the entire management apparatus 11 by reading out the management apparatus program from the storage 60B and executing the read management apparatus program on the memory 60C.

The communication I/F 66 is, for example, a network interface. The communication I/F 66 is communicably connected to the communication I/F 34 of the surveillance camera 10 through a network and controls transfer of various information with respect to the surveillance camera 10. For example, the communication I/F 66 requests the surveillance camera 10 to transmit the captured image and receives the captured image transmitted from the communication I/F 34 of the surveillance camera 10 in response to the request for transmission of the captured image.

Communication I/Fs 67 and 68 are, for example, network interfaces. The communication I/F 67 is communicably connected to the driver 75 of the revolution mechanism 16 through a network. The CPU 60A controls a revolution operation of the yaw axis revolution mechanism 71 by controlling the motor 73 through the communication I/F 67 and the driver 75. The communication I/F 68 is communicably connected to the driver 76 of the revolution mechanism 16 through a network. The CPU 60A controls a revolution operation of the pitch axis revolution mechanism 72 by controlling the motor 74 through the communication I/F 68 and the driver 76.

The reception device 62 includes, for example, a keyboard, a mouse, and a touch panel and receives various instructions from the user. The CPU 60A acquires the various instructions received by the reception device 62 and operates in accordance with the acquired instructions. For example, in a case where a processing content for the surveillance camera 10 and/or the revolution mechanism 16 is received by the reception device 62, the CPU 60A operates the surveillance camera 10 and/or the revolution mechanism 16 in accordance with an instruction content received by the reception device 62.

The display 13 displays various information under control of the CPU 60A. Examples of the various information displayed on the display 13 include contents of the various instructions received by the reception device 62 and the captured image received by the communication I/F 66.

The management apparatus 11 comprises the secondary storage device 14. For example, the secondary storage device 14 is a non-volatile memory and stores various information under control of the CPU 60A. Examples of the various information stored in the secondary storage device 14 include the captured image received by the communication I/F 66.

In such a manner, the control device 60 performs a control of displaying the captured image received by the communication I/F 66 on the display 13 and a control of storing the captured image received by the communication I/F 66 in the secondary storage device 14.

Here, while the control device 60 displays the captured image on the display 13 and stores the captured image received by the communication I/F 66 in the secondary storage device 14, the disclosed technology is not limited thereto. For example, any of the display of the captured image on the display 13 and the storage of the captured image in the secondary storage device 14 may be performed.

Figure 6:
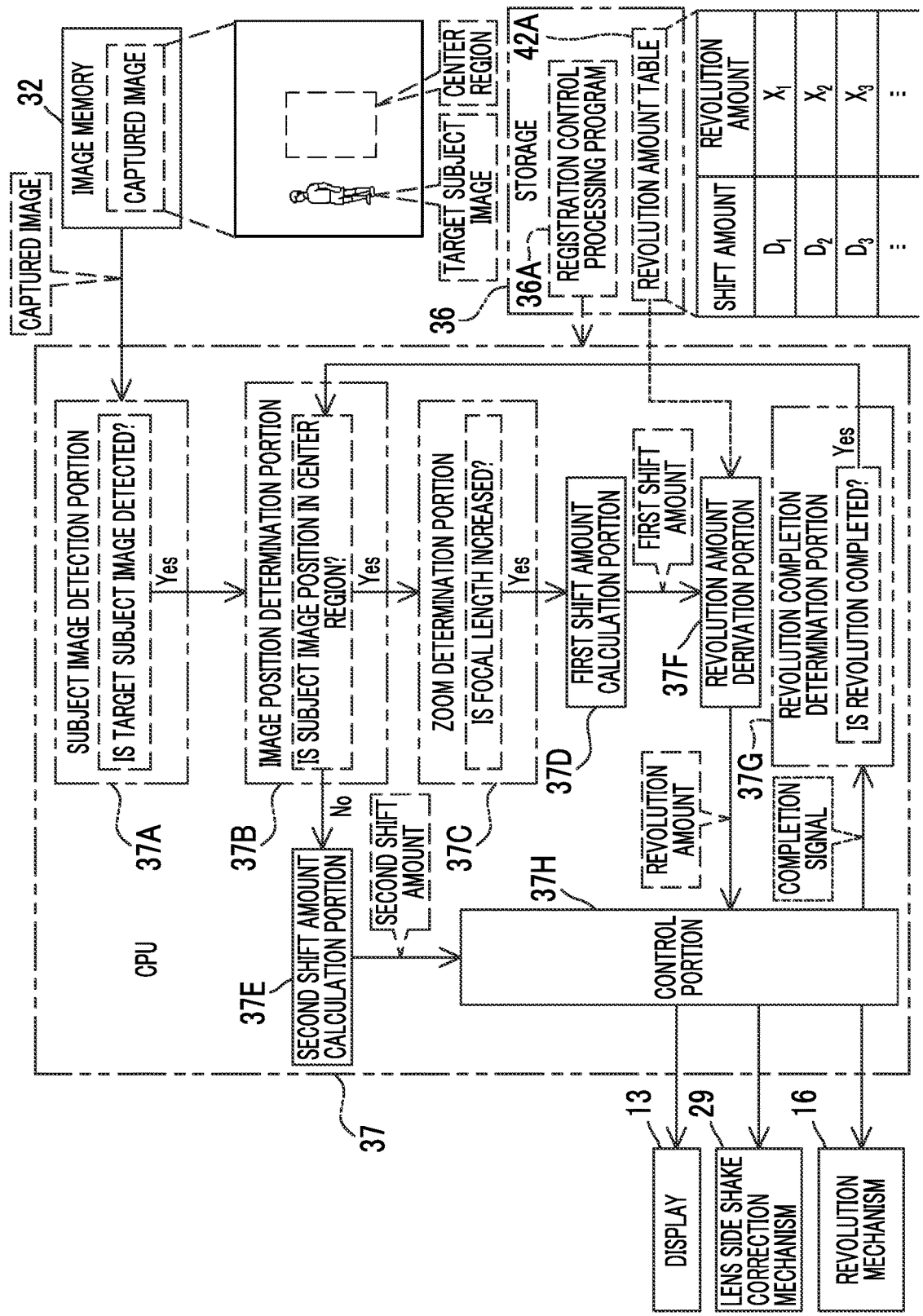
FIG. 6 is a function block diagram illustrating an example of functions of a CPU included in the surveillance camera according to the first embodiment.

As illustrated in FIG. 6 as an example, the storage 36 stores a registration control processing program 36A. The CPU 37 reads out the registration control processing program 36A from the storage 36. The CPU 37 functions as an imaging support device that supports imaging performed by the surveillance camera 10, by executing the registration control processing program 36A read out from the storage 36 on the memory 35. Specifically, the CPU 37 operates as a subject image detection portion 37A, an image position determination portion 37B, a zoom determination portion 37C, a first shift amount calculation portion 37D, a second shift amount calculation portion 37E, a revolution amount derivation portion 37F, a revolution completion determination portion 37Q and the control portion 37H. The subject image detection portion 37A and the image position determination portion 37B are an example of a "detection portion" according to the embodiment of the disclosed technology. The control portion 37H is an example of a "control portion" according to the embodiment of the disclosed technology. The CPU 37 is an example of a "processor" according to the embodiment of the disclosed technology. The memory 35 is an example of a "memory" according to the embodiment of the disclosed technology.

The subject image detection portion 37A acquires the captured image of one frame from the image memory 32. Then, the subject image detection portion 37A detects the target subject image in the captured image acquired from the image memory 32. In addition, in a case where the target subject image is detected, the subject image detection portion 37A detects the subject image position. As will be described later, the detection of the subject image position by the subject image detection portion 37A is also performed in a case where the revolution mechanism 16 operates.

Figure 7B:
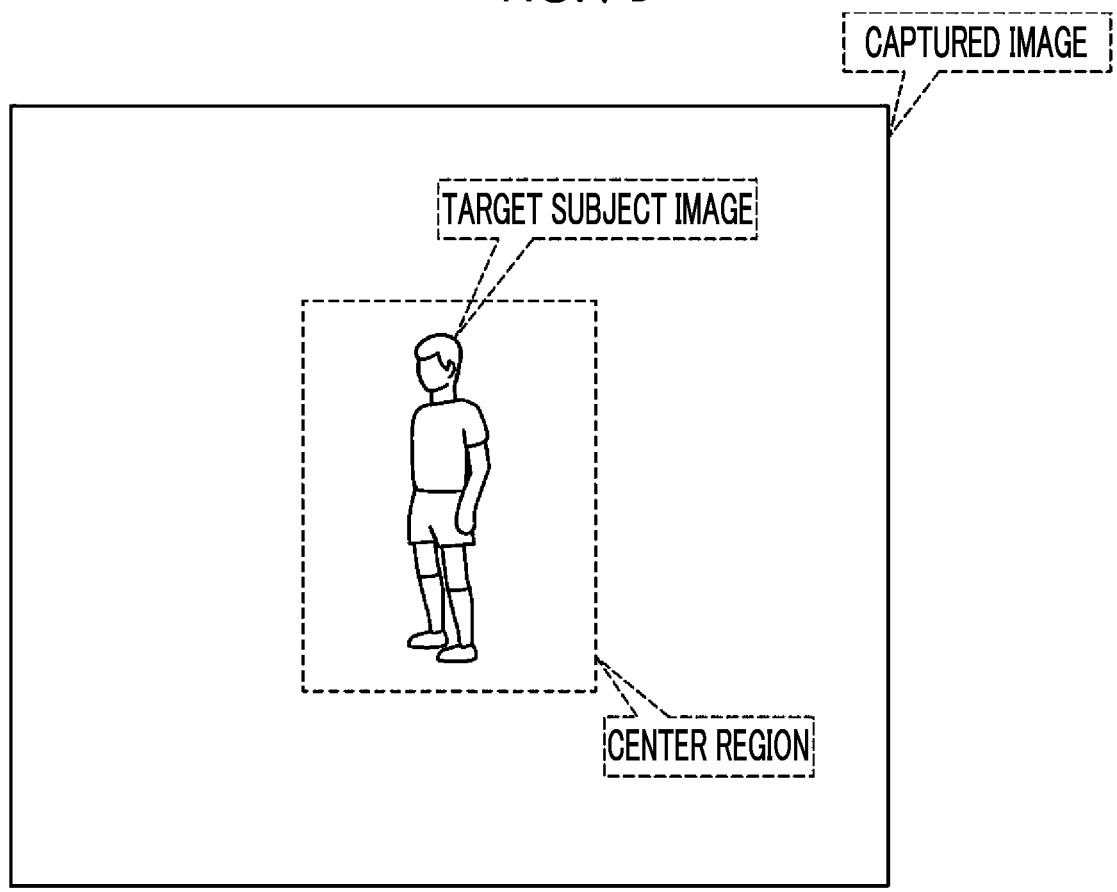
FIG. 7B is a schematic image diagram illustrating an example of a captured image obtained by capturing the imaging region illustrated in FIG. 7A by the surveillance camera.
Figure 8B:
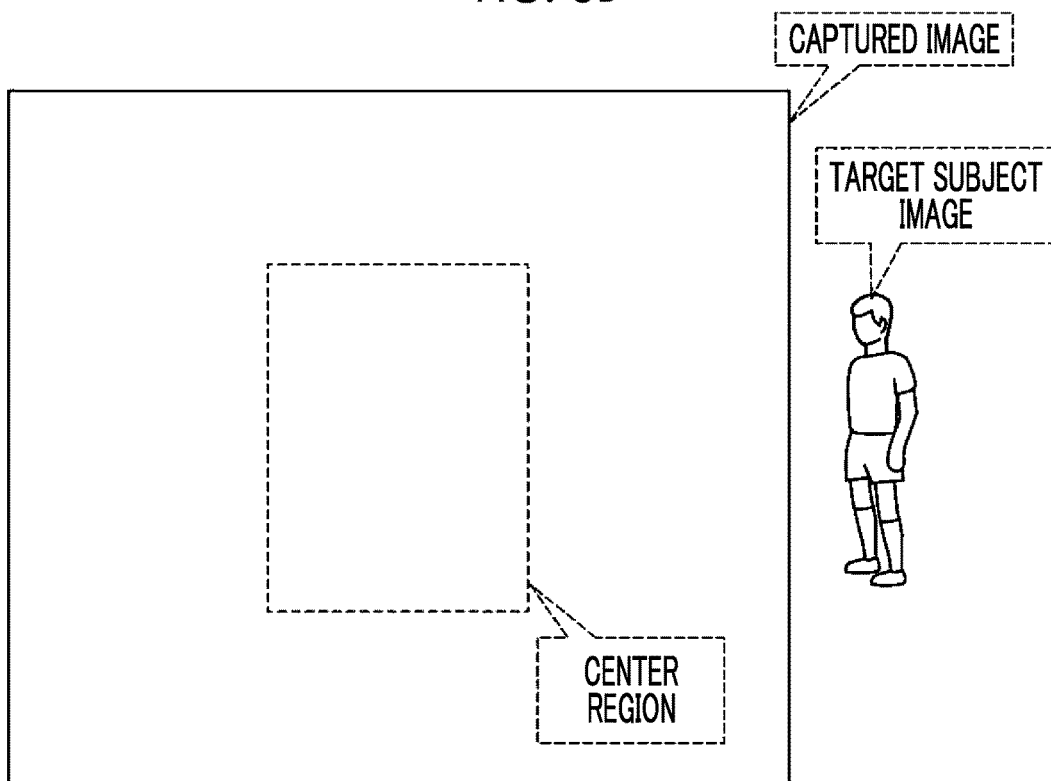
FIG. 8B is a schematic image diagram illustrating an example of the captured image obtained by capturing the imaging region illustrated in FIG. 8A by the surveillance camera.

The image position determination portion 37B determines whether or not the subject image position detected by the subject image detection portion 37A is in the center region in the captured image. As illustrated in FIG. 7A and FIG. 7B as an example, in a case where the target subject is included in the captured image, the subject image position is in the center region in the captured image. However, as illustrated in FIG. 8A and FIG. 8B as an example, in a case where the target subject deviates from the imaging region by the revolution of the surveillance camera 10 by the revolution mechanism 16 or movement of the target subject, the subject image position is not in the center region.

In a case where the target subject image is present in the center region, a positive determination is made by the image position determination portion 37B. Here, "present" means an aspect in which at least a part of the target subject image overlaps with the center region. That is, in a case where at least a part of the target subject image overlaps with the center region, a determination "present" is made by the image position determination portion 37B. Examples of at least the part of the target subject image include an image showing a specific part included in the subject image (for example, in a case where the target subject is a person, a face of the person). In a case where an image recognition function such as a so-called face recognition function is implemented in the surveillance camera 10, and the image showing the specific part is detected by the image recognition function, the image position determination portion 37B may determine that the target subject image is present in the center region. The center region is an example of a "specific position" according to the embodiment of the disclosed technology.

The zoom determination portion 37C detects the focal length of the surveillance camera 10 in a case where the image position determination portion 37B determines that the subject image position is in the center region. The zoom determination portion 37C determines whether or not the focal length is increased from a change in focal length (for example, a change from the focal length before a few frames to the current focal length). In a case where the focal length is increased, the angle of view of the surveillance camera 10 is narrowed compared to a case before the increase.

Figure 9:
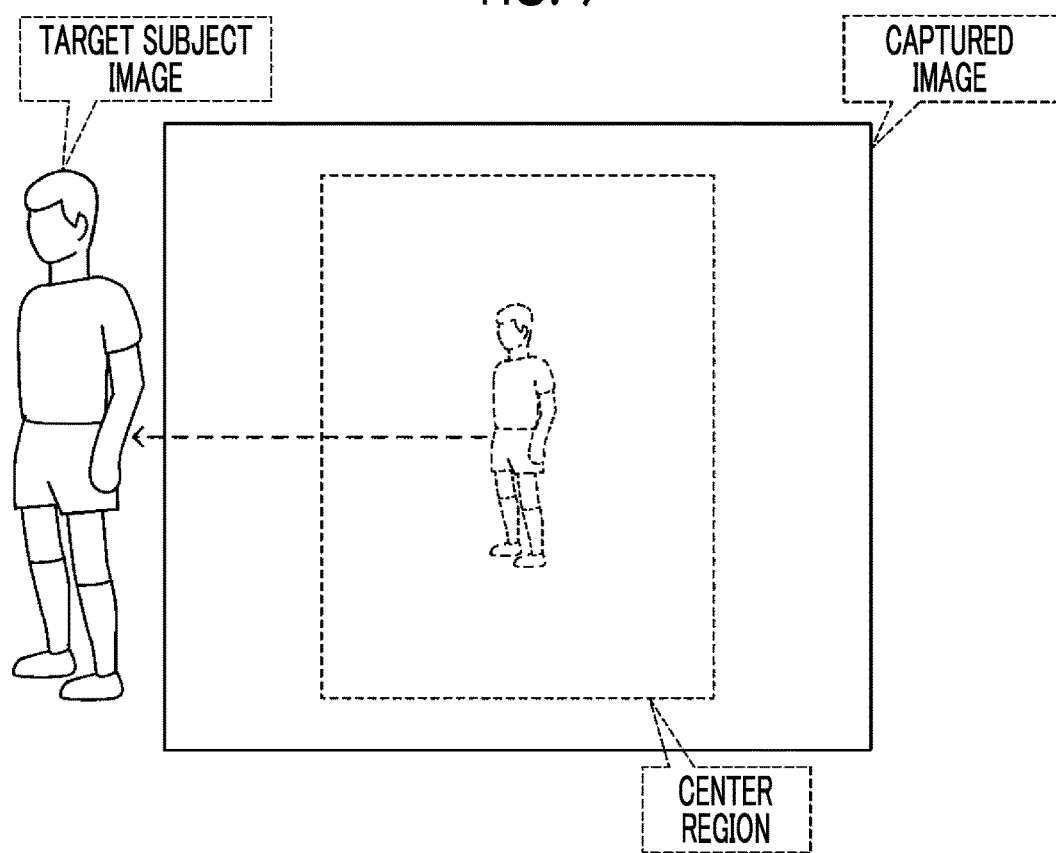
FIG. 9 is a schematic image diagram illustrating an example of an aspect in which a target subject image deviates from the captured image in accordance with increasing of a focal length of the surveillance camera according to the first embodiment.

Here, in a case where the focal length is increased in a state where the target subject is at a position shifted from the optical axis OA, the entire captured image is enlarged with a position of the optical axis OA as a center. Accordingly, as illustrated in FIG. 9 as an example, the target subject image is shifted from the center region. In the example illustrated in FIG. 9, an aspect in which the target subject image deviates from the captured image is illustrated.

The first shift amount calculation portion 37D calculates a first shift amount in a case where the zoom determination portion 37C determines that the focal length is increased. The first shift amount is an amount indicating shifting (difference in relative position) of the subject image position with respect to the center region in the captured image and is a vector having two values in the direction of the pitch axis PA and the direction of the yaw axis YA. Examples of the first shift amount include a shift amount between a center of the target subject image and a center of the center region. For example, the center of the target subject image can be obtained as two values of a center coordinate in the direction of the pitch axis PA and a center coordinate in the direction of the yaw axis YA of the target subject image. The first shift amount is an example of an "offset amount" according to the embodiment of the disclosed technology.

The storage 36 stores a revolution amount table 42A. As illustrated in FIG. 9 as an example, the subject image position detected by the subject image detection portion 37A may be shifted from the center region in the captured image. In this case, the subject image position can be moved to approach the center region in the captured image by causing the surveillance camera 10 to revolve by the revolution mechanism 16. As illustrated in FIG. 6 as an example, the revolution amount table 42A is information in which the shift amount between the subject image position and the center region and the revolution amount of the surveillance camera 10 by the revolution mechanism 16 are associated with each other, and is used in a case of causing the subject image position to approach the center region in the captured image. The revolution amount is decided in accordance with each of the direction of the pitch axis PA and the direction of the yaw axis YA. Examples of the revolution amount defined in the revolution amount table 42A include a revolution amount that is derived in advance as an optimal revolution amount for resolving the shift amount by a sensory test using an actual apparatus and/or computer simulation. Here, while the revolution amount table 42A is illustrated, the disclosed technology is not limited thereto. A revolution amount derivation calculation expression that takes the shift amount as an independent variable and takes the revolution amount as a dependent variable may be applied together with the revolution amount table 42A or instead of the revolution amount table 42A.

The revolution amount derivation portion 37F acquires the revolution amount table 42A from the storage 36. In addition, the revolution amount derivation portion 37F acquires the first shift amount from the first shift amount calculation portion 37D. The revolution amount derivation portion 37F derives the revolution amount corresponding to the first shift amount from the revolution amount table 42A. The revolution amount is also a vector having two values in the pitch direction and the yaw direction. The revolution amount derivation portion 37F outputs the derived revolution amount to the control portion 37H.

The control portion 37H operates the revolution mechanism 16 based on the revolution amount derived by the revolution amount derivation portion 37F. The revolution mechanism 16 is operated based on the revolution amount that is decided in accordance with a ratio of the revolution amount derived by the revolution amount derivation portion 37F between each of the pitch direction and the yaw direction in the revolution mechanism 16. The surveillance camera 10 is caused to revolve by the revolution mechanism 16. By causing the surveillance camera 10 to revolve, the imaging range is changed such that the subject image position approaches the center region in the captured image.

In a case where the revolution of the surveillance camera 10 by the revolution mechanism 16 is completed, the control portion 37H outputs a completion signal indicating that the revolution of the surveillance camera 10 by the revolution mechanism 16 is completed to the revolution completion determination portion 37G.

The revolution completion determination portion 37G determines whether or not the revolution of the surveillance camera 10 by the revolution mechanism 16 is completed. In a case where the completion signal is input from the control portion 37H, the revolution completion determination portion 37G determines that the revolution of the surveillance camera 10 by the revolution mechanism 16 is completed. In a case where the revolution completion determination portion 37G determines that the revolution is completed, the image position determination portion 37B determines whether or not the subject image position is in the center region.

The second shift amount calculation portion 37E calculates a second shift amount in a case where the image position determination portion 37B determines that the subject image position is not in the center region. The second shift amount is an amount indicating shifting (difference in relative position) of the subject image position with respect to the center region and is a vector having two values in the direction of the pitch axis PA and the direction of the yaw axis YA. Examples of the second shift amount include the shift amount between the center of the target subject image and the center of the center region. As an example, the center of the target subject image can be obtained as two values of the center coordinate in the direction of the pitch axis PA and the center coordinate in the direction of the yaw axis YA of the target subject image. The second shift amount is an example of the "offset amount" according to the embodiment of the disclosed technology. Hereinafter, for convenience of description, the first shift amount and the second shift amount will be referred to as the "offset amount" unless otherwise necessary to distinguish therebetween.

Here, the subject image position may be shifted from the center region in the captured image by causing the surveillance camera 10 to revolve by the revolution mechanism 16. Registration of the position of the captured image can be performed on the captured image by causing the surveillance camera 10 to revolve by the revolution mechanism 16. However, accuracy of the registration is decreased in accordance with changing of magnification for the focal length to the telephoto side. In such a manner, the offset amount in the captured image is increased due to changing of magnification for the focal length to the telephoto side.

Figure 11:
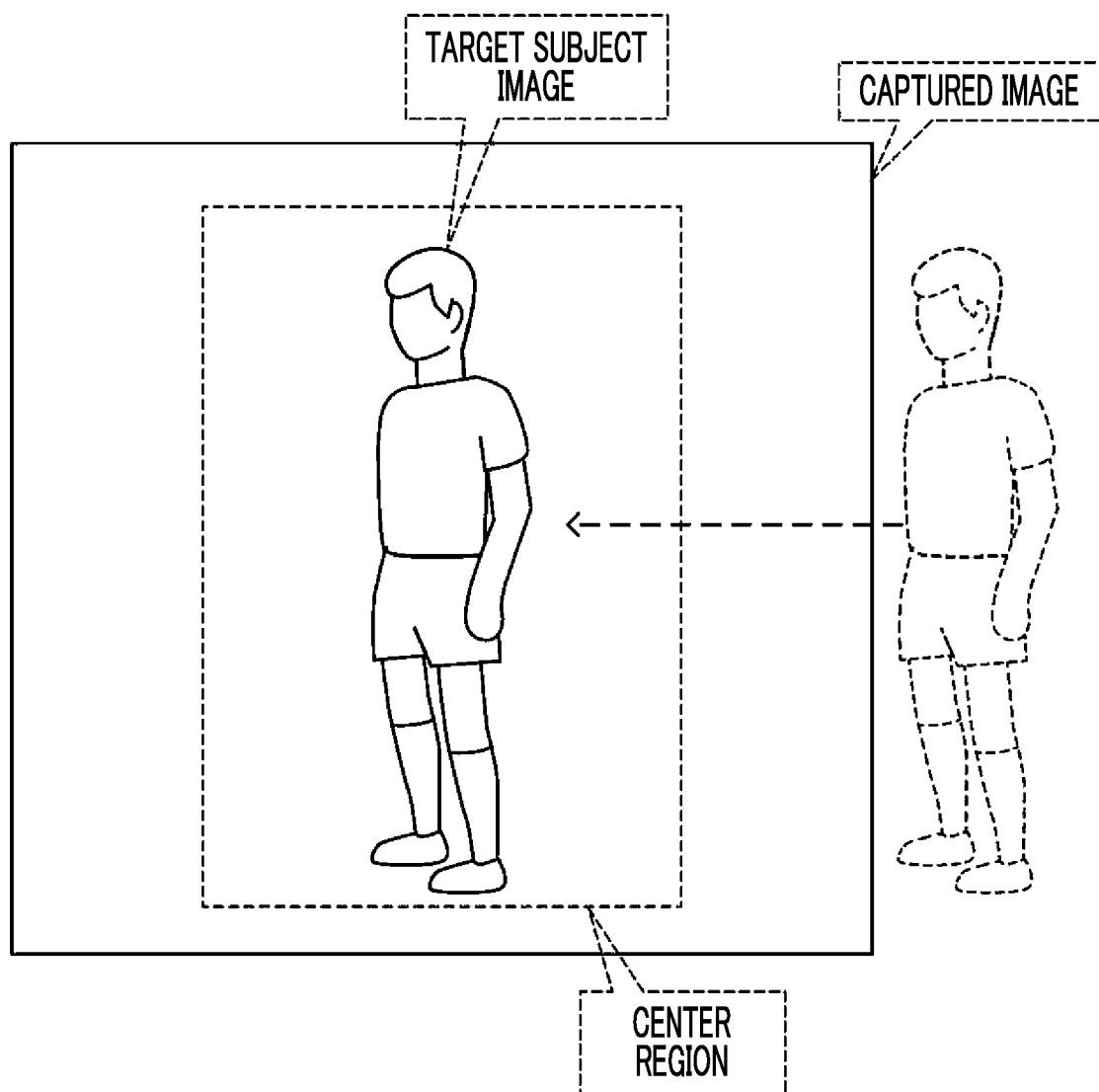
FIG. 11 is a schematic image diagram illustrating an example of an aspect in which the target subject image is caused to fall within a center region of the captured image by operating a lens side shake correction mechanism according to the first embodiment.

The control portion 37H moves the anti-vibration lens 15B1 in the two-dimensional plane of the anti-vibration lens by operating the lens side shake correction mechanism 29 in accordance with the offset amount. In such a manner, by moving the anti-vibration lens 15B1 in the two-dimensional plane of the anti-vibration lens under control of the control portion 37H, the subject image position approaches the center region as illustrated in FIG. 11 as an example.

The captured image transmitted from the surveillance camera 10 is sequentially input into the control device 60 of the management apparatus 11. The display 13 displays the captured image sequentially input into the control device 60 as, for example, a live view image under control of the control device 60.

Figure 12B:
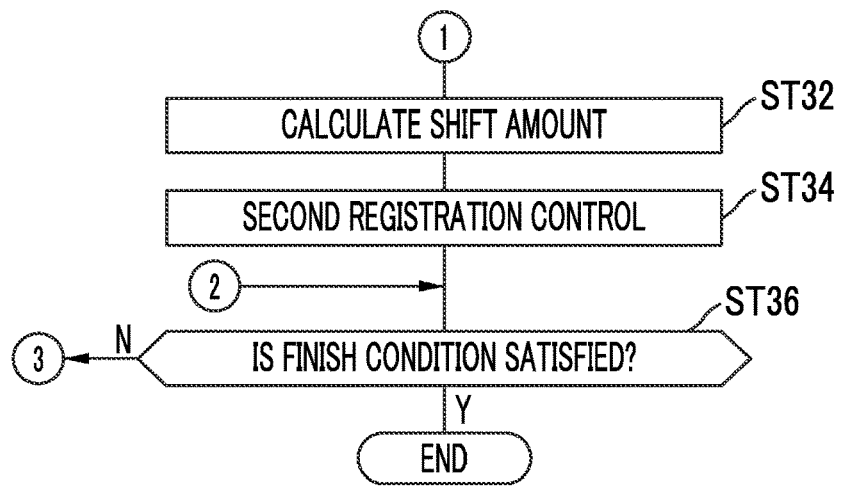
FIG. 12B is a flowchart illustrating an example of the flow of registration control processing according to the first embodiment.

Next, actions of parts of the surveillance system 2 according to the embodiment of the disclosed technology will be described with reference to FIG. 12A and FIG. 12B. FIG. 12A and FIG. 12B illustrate an example of a flow of registration control processing executed by the CPU 37. A registration control is a control including a control of setting the subject image position detected by the subject image detection portion 37A to the center region by operating the lens side shake correction mechanism 29. The flow of registration control processing illustrated in FIG. 12A and FIG. 12B is an example of an "imaging support method" according to the embodiment of the disclosed technology.

In the registration control processing illustrated in FIG. 12A and FIG. 12B, first, in step ST10, the subject image detection portion 37A determines whether or not a new captured image is stored in the image memory 32. In step ST10, in a case where a new captured image is not stored in the image memory 32, a negative determination is made, and the registration control processing transitions to step ST36 illustrated in FIG. 12B. In step ST10, in a case where a new captured image is stored in the image memory 32, a positive determination is made, and the registration control processing transitions to step ST12.

In step ST12, the subject image detection portion 37A acquires the captured image. The registration control processing transitions to step ST14.

In step ST14, the subject image detection portion 37A executes subject image detection processing. The subject image detection processing refers to processing of detecting the target subject image from the captured image.

In subsequent step ST16, the subject image detection portion 37A determines whether or not the target subject image is detected from the captured image by executing the subject image detection processing. In step ST16, in a case where the subject image is not detected in the captured image, a negative determination is made, and the registration control processing transitions to step ST36 illustrated in FIG. 12B. In step ST16, in a case where the target subject image is detected from the captured image by executing the subject image detection processing, a positive determination is made, and the registration control processing transitions to step ST18.

In step ST18, the subject image detection portion 37A detects the subject image position from the captured image. For example, in a case where the target subject image is a standing person image in a front view, the subject image detection portion 37A detects the subject image position by detecting a head top portion of the person image as an upper end portion of the target subject image and detecting a foot tip portion of the person image as a lower end portion of the target subject image. In addition, the subject image detection portion 37A detects a right shoulder portion or a right arm portion of the person image as a right end portion of the target subject image and detects a left shoulder portion or a left arm portion of the person image as a left end portion of the target subject image.

In subsequent step ST20, the image position determination portion 37B determines whether or not the subject image position is in the center region. In step ST20, in a case where the subject image position is in the center region, a positive determination is made, and the registration control processing transitions to step ST22. In step ST20, in a case where the subject image position is not in the center region, a negative determination is made, and the registration control processing transitions to step ST32 illustrated in FIG. 12B.

In step ST32 illustrated in FIG. 12B, the second shift amount calculation portion 37E calculates the second shift amount.

Figure 13:
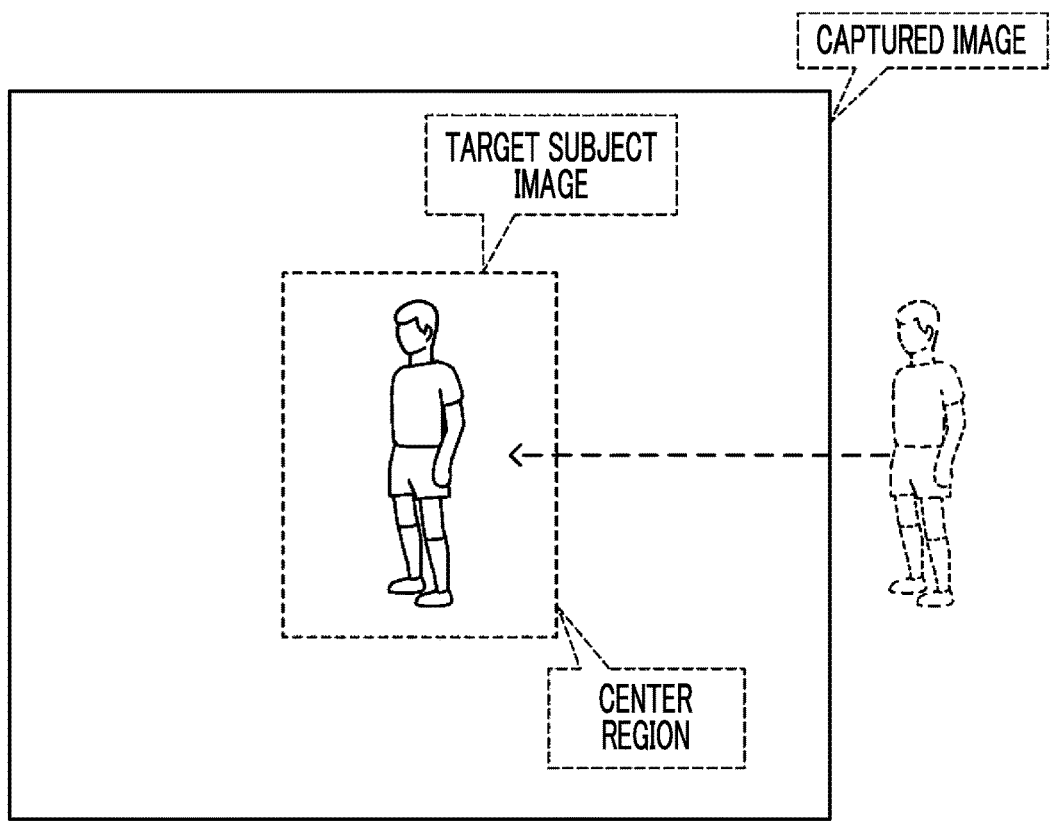
FIG. 13 is a schematic image diagram illustrating an example of an aspect in which the target subject image is caused to fall within the center region of the captured image by performing a second registration control included in the registration control processing according to the first embodiment.

In subsequent step ST34, the control portion 37H performs a second registration control by operating the lens side shake correction mechanism 29 in accordance with the second shift amount calculated in step ST32. By operating the lens side shake correction mechanism 29, as illustrated in FIG. 13 as an example, the subject image position that is outside the center region in FIG. 13 before the lens side shake correction mechanism 29 is operated is caused to fall within the center region after the lens side shake correction mechanism 29 is operated.

Meanwhile, in step ST22 illustrated in FIG. 12A, the zoom determination portion 37C determines whether or not the focal length of the surveillance camera 10 is increased. In step ST22, in a case where the focal length is not increased, a negative determination is made, and the registration control processing transitions to step ST36 illustrated in FIG. 12B. In step ST22, in a case where the focal length is increased, a positive determination is made, and the registration control processing transitions to step ST24.

As illustrated in FIG. 9 as an example, in a case where the focal length is increased, the subject image position may not only be shifted from the center region but also deviate from the captured image. Therefore, in step ST24, the first shift amount calculation portion 37D calculates the first shift amount. The registration control processing transitions to step ST26.

In step ST26, the revolution amount derivation portion 37F derives the revolution amount corresponding to the first shift amount derived in step ST24 from the revolution amount table 42A. The registration control processing transitions to step ST28.

In step ST28, the control portion 37H performs a first registration control by operating the revolution mechanism 16 based on the revolution amount derived in step ST26. The control portion 37H moves the subject image position toward the center region by operating the revolution mechanism 16.

In step ST30, the revolution completion determination portion 37G determines whether or not the revolution is completed. In step ST30, in a case where the revolution is not completed, a negative determination is made, and the determination in step ST30 of the registration control processing is performed again. In step ST30, in a case where the revolution is completed, a positive determination is made, and the registration control processing transitions to step ST20.

In step ST36 illustrated in FIG. 12B, the control portion 37H determines whether or not a condition (hereinafter, referred to as a "finish condition") under which the registration control processing is finished is satisfied. Examples of the finish condition include a condition that an instruction to finish the registration control processing is received by the reception device 62. In step ST36, in a case where the finish condition is not satisfied, a negative determination is made, and the registration control processing transitions to step ST10 illustrated in FIG. 12A. In step ST36, in a case where the finish condition is satisfied, a positive determination is made, and the registration control processing is finished.

Figure 10:
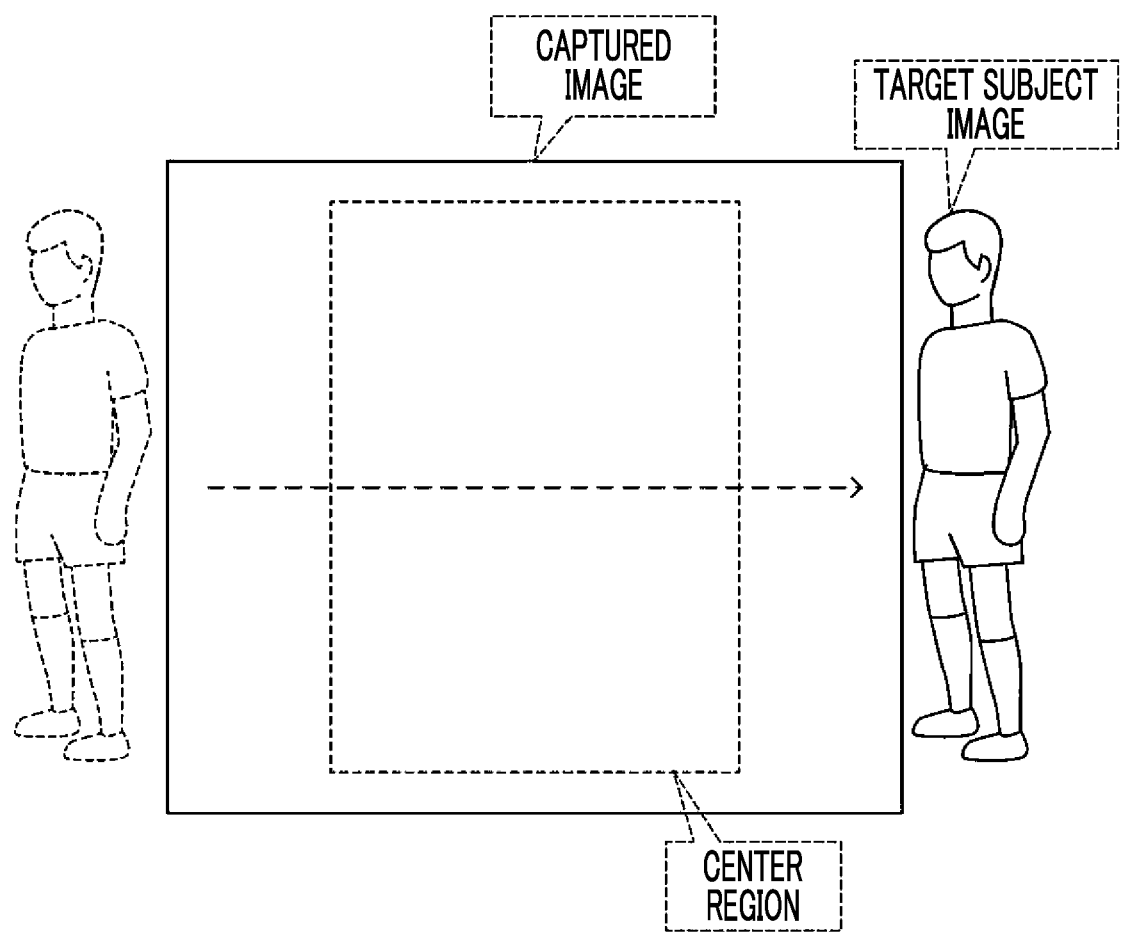
FIG. 10 is a schematic image diagram illustrating an example of an aspect in which the target subject image moves from a left side to a right side of the captured image according to the first embodiment.

The accuracy of the registration performed by the revolution of the surveillance camera 10 is generally lower than the accuracy of the registration performed by operating the lens side shake correction mechanism 29. For example, as illustrated in FIG. 10, in a case where the revolution mechanism 16 is operated, the subject image position (a position illustrated by a dash double dotted line) on a left side of the captured image from the center region may move to the right side of the captured image (a position illustrated by a solid line) and may not be present in the center region.

In addition, even in a case of trying to operate the revolution mechanism 16 by setting, for example, 1 degree (60 minutes) in angular measure, variations such as a revolution angle of 57 minutes or a revolution angle of 63 minutes occur in the revolution angle based on the operation of the revolution mechanism 16. Accordingly, the accuracy in a case of moving the subject image position to the center region by operating the revolution mechanism 16 is limited.

Meanwhile, in a case of moving the subject image position in the captured image by operating the lens side shake correction mechanism 29, high-accuracy registration can be performed compared to a case of operating the revolution mechanism 16. That is, the subject image position can be set to the center region in the captured image by operating the lens side shake correction mechanism 29 to perform the second registration control.

Particularly, in the present embodiment, the variations in revolution angle are adjusted to less than the half of the angle of view on the telephoto side of the variable magnification mechanism. In addition, the variations in revolution angle are adjusted to less than the offset amount. Accordingly, in a state where the variable magnification mechanism is on the telephoto side, even in a case where variations occur in the stoppage position of the revolution of the surveillance camera 10 by the revolution mechanism 16, the subject image position can be set to the center region in the captured image by operating the lens side shake correction mechanism 29.

For example, the subject image position may not be present in the center region due to the revolution of the surveillance camera 10. In such a case where the subject image position is not present in the center region, the lens side shake correction mechanism 29 is operated in accordance with the second shift amount by the registration control processing. Accordingly, even in an event in which the subject image position is not positioned in the center region regardless of trying to move the subject image position into the center region by operating the revolution mechanism 16, the subject image position can be set in the center region as illustrated in FIG. 11 by subsequently operating the lens side shake correction mechanism 29.

As described above, the surveillance camera 10 comprises an imaging support device 44. In the imaging support device 44, in a case where the focal length of the surveillance camera 10 is increased, that is, in a case of changing magnification to the telephoto side, the control portion 37H performs the registration control of setting the subject image position to the center region even in a case where the subject image position is shifted from the center region in accordance with the changing of magnification. In such a manner, even in a case where the subject image position is shifted with respect to the captured image by the changing of magnification to the telephoto side, the subject image position can be set to the center region (an example of the "specific position" according to the embodiment of the disclosed technology) in the captured image.

The surveillance camera 10 includes the lens side shake correction mechanism 29. The lens side shake correction mechanism 29 is a mechanism that corrects the shake occurring due to the vibration exerted on the surveillance camera 10. The registration control includes the control of setting the subject image position detected by the subject image detection portion 37A to the center region by operating the lens side shake correction mechanism 29. In such a manner, the registration control is performed using the lens side shake correction mechanism 29 that is a mechanism correcting the shake occurring due to the vibration exerted on the surveillance camera 10. Accordingly, increasing of the number of components required for the registration control can be suppressed compared to a case where a mechanism used for only the registration control is mounted in the surveillance camera 10.

The registration control performed by the imaging support device 44 includes a control of setting the subject image position to the center region by operating the revolution mechanism 16. Since the existing revolution mechanism 16 is used, increasing of the number of components required for the registration control can be suppressed compared to a case where the mechanism used for only the registration control is newly provided instead of the revolution mechanism 16.

The "offset amount" according to the present embodiment includes the first shift amount and the second shift amount. In performing the registration control, the control portion 37H operates at least one of the lens side shake correction mechanism 29 or the revolution mechanism 16 in accordance with the offset amount. In other words, the registration control can be performed by operating both of the lens side shake correction mechanism 29 and the revolution mechanism 16. Accordingly, high-accuracy registration of the subject image position to the center region can be implemented compared to a case where only the lens side shake correction mechanism 29 or the revolution mechanism 16 is operated for the registration control.

The registration control includes the first registration control performed by operating the revolution mechanism 16 and the second registration control performed by operating the lens side shake correction mechanism 29. Registration accuracy of the second registration control is higher than registration accuracy of the first registration control. The control portion 37H first performs the registration control with relatively low accuracy and then, performs the registration control with relatively high accuracy by performing the first registration control and then, performing the second registration control. Thus, for example, high accuracy of the registration of the subject image position to the center region can be implemented compared to a case of performing the registration control using only the revolution mechanism 16.

Particularly, in the registration control using the revolution mechanism 16, in a case where variations occur in the revolution angle based on the operation of the revolution mechanism 16, it is difficult to position the subject image position in the center region in the registration control based on the revolution mechanism 16. In the present embodiment, in the registration control, coarse adjustment of the subject image position is performed by operating the revolution mechanism 16, and then, fine adjustment of the subject image position is performed by operating the lens side shake correction mechanism 29. Thus, high accuracy of the registration control can be implemented.

In the present embodiment, the surveillance camera 10 has a function (optical zoom function) of changing magnification for the focal length. As illustrated in FIG. 9 as an example, the subject image position that is present in the center region before the changing of magnification may deviate from the center region after the changing of magnification and furthermore, may deviate from the captured image. In a case where the subject image position deviates from the captured image, the subject image position can be relatively moved into the captured image by operating the revolution mechanism 16. In a state where the subject image position is in the captured image, the subject image position can be caused to accurately fall within the center region by operating the lens side shake correction mechanism 29. In a case where the subject image position deviates from the captured image, a situation in which the subject image position is present in the captured image may be obtained by widening the angle of view by temporarily changing magnification for the focal length of the surveillance camera 10 to the wide angle side. In a state where the focal length of the surveillance camera 10 is set to the wide angle side, the revolution mechanism 16 may be operated to move the subject image position toward the center region, and then, magnification for the focal length of the surveillance camera 10 may be changed again to the telephoto side (for example, changed to a value before the changing of magnification to the wide angle side).

In the present embodiment, the subject image position may be shifted from the center region in the captured image by the revolution of the surveillance camera 10 by the revolution mechanism 16. The offset amount of the subject image position is relatively increased by increasing the focal length (changing magnification to the telephoto side). In the registration control of the present embodiment, since the subject image position is set to the center region by the lens side shake correction mechanism 29, the registration can be performed regardless of the offset amount in a case where the subject image position is in the captured image. In addition, the accuracy (registration accuracy) in setting the subject image position to the center region is decreased by increasing the focal length (changing magnification to the telephoto side). In other words, even in a case where the surveillance camera 10 revolves by a constant revolution angle, the subject image position more significantly changes by the revolution of the surveillance camera 10 in a state where the focal length is relatively on the telephoto side than in a state where the focal length is on the wide angle side. Thus, the registration accuracy based on the revolution is relatively decreased. In such a manner, even in a case where the accuracy of the registration based on the revolution is relatively decreased in accordance with the changing of magnification to the telephoto side by the variable magnification mechanism, the registration can be performed by operating at least one of the lens side shake correction mechanism 29, the imaging element side shake correction mechanism 45, or the electronic shake correction portion 33 regardless of the offset amount in a case where the subject image position is in the captured image after the revolution of the surveillance camera 10.

The center region is an example of the "specific position" according to the embodiment of the disclosed technology. By setting the specific position as the center region in the captured image, the subject image position can be set to the center in the captured image. The "specific position" is not limited to the center region in the captured image and may be a position shifted from the center of the captured image in the direction of the pitch axis PA and the direction of the yaw axis YA.

In addition, in the surveillance camera 10, the shake is corrected by moving the anti-vibration lens 15B1. Accordingly, it is possible to correct the shake within a movable range of the anti-vibration lens 15B1 and set the subject image position to the center region.

Second Embodiment

Next, a second embodiment will be described. In the second embodiment, the same elements, members, and the like as in the first embodiment will be designated by the same reference numerals as in the first embodiment and will not be described in detail. In addition, an overall configuration of an imaging camera that is an example of an imaging apparatus of the second embodiment is the same as the surveillance camera 10 of the first embodiment and thus, will not be illustrated.

Figure 14:
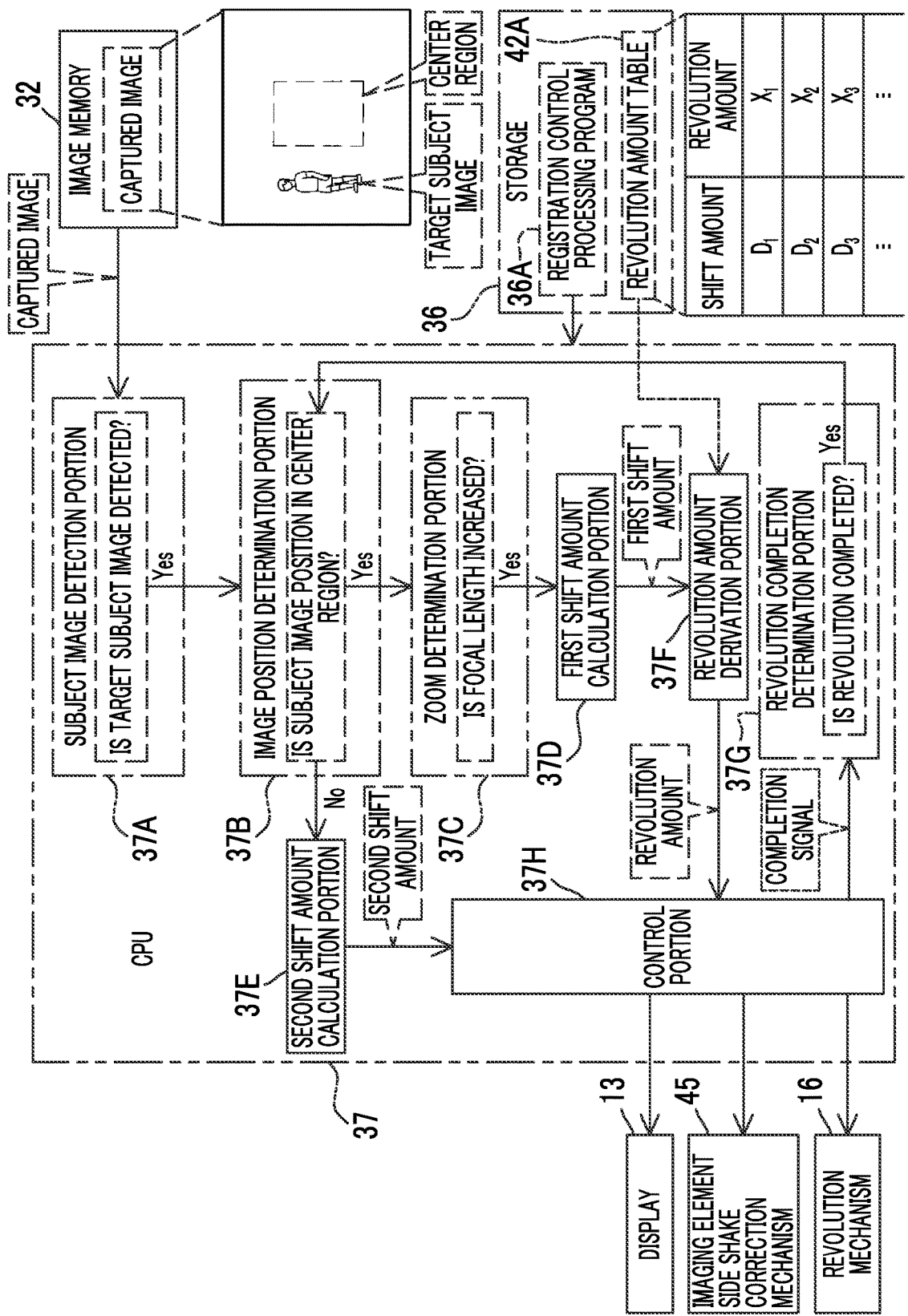
FIG. 14 is a function block diagram illustrating an example of functions of a CPU included in a surveillance camera according to a second embodiment.

In the second embodiment, as illustrated in FIG. 14 as an example, a shake correction mechanism that is operated by the control portion 37H in a case of performing the registration control is the imaging element side shake correction mechanism 45. In other words, in the flow of registration control processing of the first embodiment, the shake correction mechanism that is operated in a state where the registration control processing is in step ST34 is the imaging element side shake correction mechanism 45 in the second embodiment.

In the second embodiment, the imaging element side shake correction mechanism 45 is used in the registration control, and the lens side shake correction mechanism 29 is not used. Accordingly, the lens side shake correction mechanism 29 can be used for correcting the shake of the surveillance camera 10 during the registration control.

In the first embodiment, the lens side shake correction mechanism 29 is used in the registration control, and the imaging element side shake correction mechanism 45 and the electronic shake correction portion 33 are not used. Accordingly, at least one of the imaging element side shake correction mechanism 45 or the electronic shake correction portion 33 can be used for correcting the shake of the surveillance camera 10 during the registration control.

Third Embodiment

Next, a third embodiment will be described. In the third embodiment, the same elements, members, and the like as in the first embodiment will be designated by the same reference numerals as in the first embodiment and will not be described in detail. In addition, an overall configuration of an imaging camera that is an example of an imaging apparatus of the third embodiment is the same as the surveillance camera 10 of the first embodiment and thus, will not be illustrated.

Figure 15:
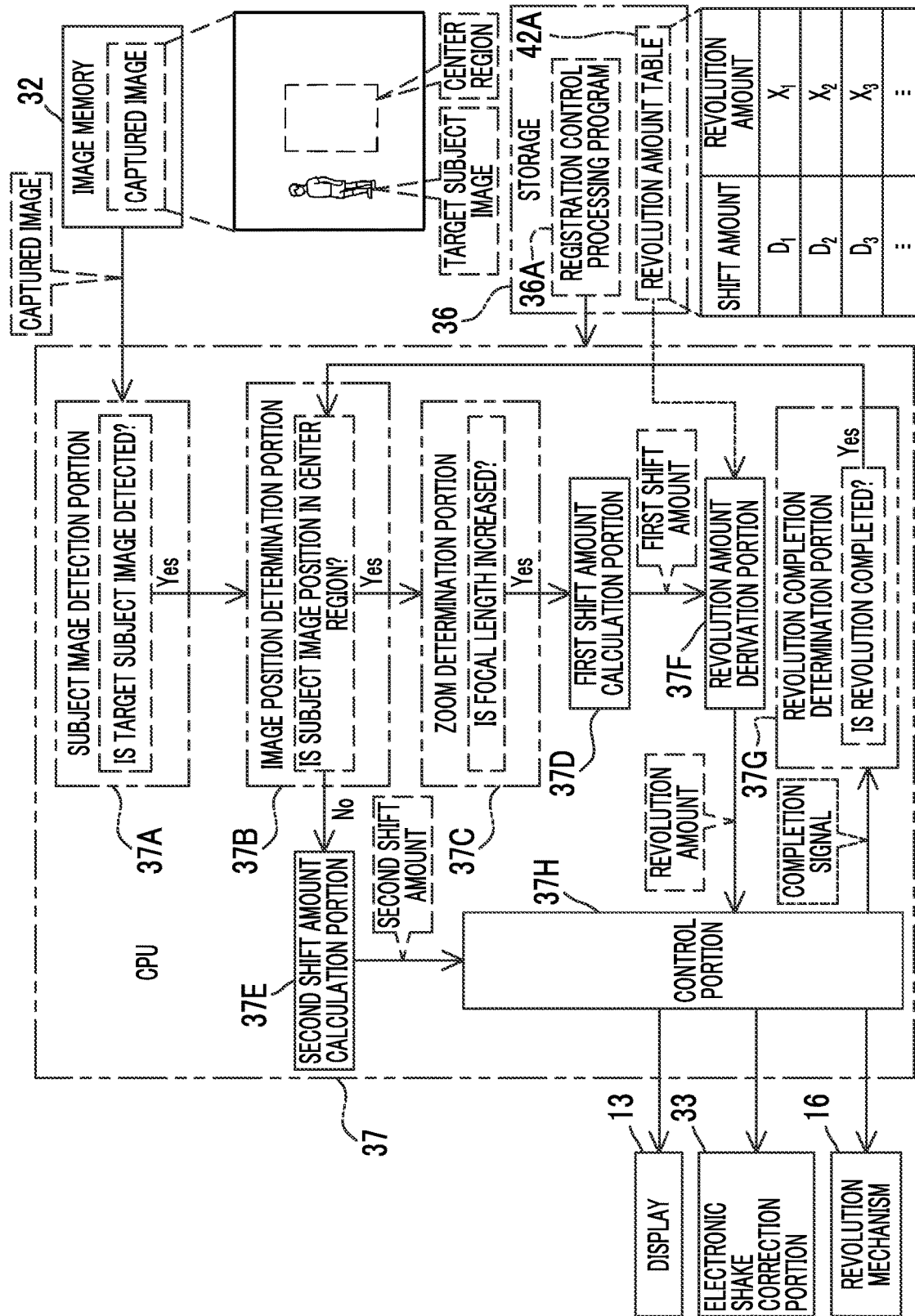
FIG. 15 is a function block diagram illustrating an example of functions of a CPU included in a surveillance camera according to a third embodiment.

In the third embodiment, as illustrated in FIG. 15 as an example, the control portion 37H operates the electronic shake correction portion 33 in a case of performing the registration control. In other words, in the flow of registration control processing of the first embodiment, the registration control processing is executed by operating the electronic shake correction portion 33 in a state where the registration control processing is in step ST34.

In the third embodiment, the electronic shake correction portion 33 is used in the registration control, and the lens side shake correction mechanism 29 and the imaging element side shake correction mechanism 45 are not used. Accordingly, at least one of the lens side shake correction mechanism 29 or the imaging element side shake correction mechanism 45 can be used for correcting the shake of the surveillance camera 10 during the registration control.

In the first embodiment, the lens side shake correction mechanism 29 is used in the registration control, and the imaging element side shake correction mechanism 45 is not used. Accordingly, the imaging element side shake correction mechanism 45 can be used for correcting the shake of the surveillance camera 10 during the registration control.

In any of the first embodiment, the second embodiment, and the third embodiment, the lens side shake correction mechanism 29, the imaging element side shake correction mechanism 45, and the electronic shake correction portion 33 are included. Accordingly, in a case of performing the registration control processing, the subject image position can be set to the center region in the registration control processing by operating at least one of the lens side shake correction mechanism 29, the imaging element side shake correction mechanism 45, or the electronic shake correction portion 33.

For example, the registration and shake correction may be executed by operating both of the lens side shake correction mechanism 29 and the imaging element side shake correction mechanism 45. In this case, the registration and the shake correction can be performed within the movable range of each of the anti-vibration lens 15B1 and the imaging element 25. In addition, in this case, a shake that is not corrected due to restriction of the movement of the anti-vibration lens 15B1 by the movable range of the anti-vibration lens 15B1 can be corrected by moving another shake correction mechanism or a shake correction portion, for example, the imaging element 25.

Furthermore, in the surveillance camera 10, the shake amount is detected in each of the direction of the pitch axis PA and the direction of the yaw axis YA. Accordingly, the shake can be corrected with high accuracy compared to a case where the shake is corrected using only the shake amount for one axial direction.

Figure 16:
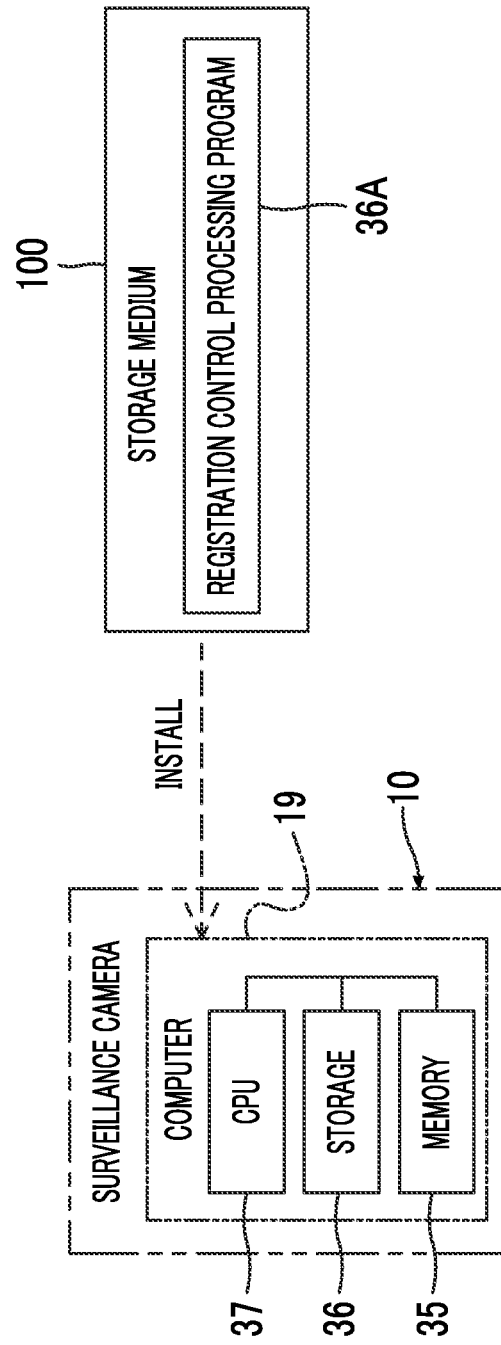
FIG. 16 is a conceptual diagram illustrating an example of an aspect in which a position adjustment program is installed on a computer in the surveillance camera from a storage medium storing the position adjustment program according to the embodiments.

In each of the embodiments, while an example of a form in which the registration control processing program 36A is stored in the storage 36 of the surveillance camera 10, and the CPU 37 of the surveillance camera executes the registration control processing program 36A in the memory 35 is illustratively described, the disclosed technology is not limited thereto. For example, an example in which the registration control processing program 36A is stored in the storage 60B of the management apparatus 11, and the CPU 60A of the management apparatus 11 executes the registration control processing program 36A in the memory 60C may be applied. Furthermore, as illustrated in FIG. 16 as an example, the registration control processing program 36A may be stored in a storage medium 100 that is a non-transitory storage medium. In a case of the example illustrated in FIG. 16, the registration control processing program 36A stored in the storage medium 100 is installed on the computer 19, and the CPU 37 executes the registration control processing in accordance with the registration control processing program 36A.

In the example illustrated in FIG. 16, the CPU 37 is a single CPU. However, the disclosed technology is not limited thereto, and a plurality of CPUs may be employed. Examples of the storage medium 100 include any portable storage medium such as an SSD or a USB memory.

In addition, the registration control processing program 36A may be stored in a storage portion of another computer, a server apparatus, or the like connected to the computer 19 through a communication network (not illustrated), and the registration control processing program 36A may be downloaded to the computer 19 in response to a request of the surveillance camera 10. In this case, the downloaded registration control processing program 36A is executed by the CPU 37 of the computer 19.

In addition, in the example illustrated in FIG. 16, while an aspect of installing the registration control processing program 36A on the computer 19 of the surveillance camera 10 is illustrated, the disclosed technology is not limited thereto. The registration control processing program 36A may be installed on the control device 60 of the management apparatus 11. In this case, the CPU 60A executes the registration control processing in accordance with the registration control processing program 36A. In addition, the registration control processing may be performed in a distributed manner between the surveillance camera 10 and the management apparatus 11. For example, the first registration control (refer to step ST28 illustrated in FIG. 12A) may be executed by the CPU 60A of the management apparatus 11, and the second registration control (refer to step ST34 illustrated in FIG. 12B) may be executed by the CPU 37 of the surveillance camera 10.

In addition, in each of the embodiments, while an example of a form in which the subject image detection portion 37A, the image position determination portion 37B, the zoom determination portion 37C, the first shift amount calculation portion 37D, the second shift amount calculation portion 37E, the revolution amount derivation portion 37F, the revolution completion determination portion 37Q and the control portion 37H are implemented by a software configuration using the computer 19 is illustratively described, the disclosed technology is not limited thereto. For example, the subject image detection portion 37A, the image position determination portion 37B, the zoom determination portion 37C, the first shift amount calculation portion 37D, the second shift amount calculation portion 37E, the revolution amount derivation portion 37F, the revolution completion determination portion 37Q and the control portion 37H may be implemented by a device including, for example, an ASIC, an FPGA, and/or a PLD. In addition, the subject image detection portion 37A, the image position determination portion 37B, the zoom determination portion 37C, the first shift amount calculation portion 37D, the second shift amount calculation portion 37E, the revolution amount derivation portion 37F, the revolution completion determination portion 37Q and the control portion 37H may be implemented by a combination of a hardware configuration and a software configuration.

Various processors illustrated below can be used as a hardware resource for executing the registration control processing. Examples of the processors include, as described above, a CPU that is a general-purpose processor functioning as the hardware resource for executing the registration control processing by executing software, that is, the program. In addition, examples of the processors include a dedicated electric circuit such as an FPGA, a PLD, or an ASIC that is a processor having a circuit configuration dedicatedly designed to execute specific processing. Any of the processors incorporates or is connected to a memory, and any of the processors executes the registration control processing using the memory.

The hardware resource for executing the registration control processing may be configured with one of those various processors or may be configured with a combination of two or more processors of the same type or different types (for example, a combination of a plurality of FPGAs or a combination of a CPU and an FPGA). In addition, the hardware resource for executing the registration control processing may be one processor.

Examples of a configuration with one processor include, first, a form in which one processor is configured with a combination of one or more CPUs and software, and the processor functions as the hardware resource for executing processing of each of the control portion 37H, the subject image detection portion 37A, and the zoom determination portion 37C. Second, as represented by an SoC or the like, a form of using a processor that implements, by one IC chip, functions of the entire system including a plurality of hardware resources for executing the registration control processing is included. In such a manner, the processing of each of the control portion 37H, the subject image detection portion 37A, and the zoom determination portion 37C is implemented using one or more of the various processors as the hardware resource.

Furthermore, more specifically, an electric circuit in which circuit elements such as semiconductor elements are combined can be used as a hardware structure of those various processors.

In addition, the registration control processing is merely an example. Accordingly, unnecessary steps may be deleted, new steps may be added, or a processing order may be rearranged without departing from the gist of the disclosed technology.

In addition, in each of the embodiments, while the surveillance camera 10 is illustrated as an example of the imaging apparatus according to the embodiment of the disclosed technology, the disclosed technology is not limited thereto. For example, the disclosed technology can also be applied to various electronic apparatuses such as a portable lens-interchangeable camera, a portable fixed lens camera, a personal computer, a smart device, or a wearable terminal apparatus instead of the surveillance camera 10. The same actions and effects as the surveillance camera 10 described in each of the embodiments are also obtained for these electronic apparatuses.

Above described contents and illustrated contents are detailed description for parts according to the embodiment of the disclosed technology and are merely an example of the disclosed technology. For example, description related to the above configurations, functions, actions, and effects is description related to an example of configurations, functions, actions, and effects of the parts according to the embodiment of the disclosed technology. Thus, unnecessary parts may be removed, new elements may be added, or parts may be replaced in the above described contents and the illustrated contents without departing from the gist of the disclosed technology. In addition, particularly, description related to common technical knowledge or the like that does not need to be described in terms of embodying the disclosed technology is omitted in the above described contents and the illustrated contents in order to avoid complication and facilitate understanding of the parts according to the embodiment of the disclosed technology.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards are specifically and individually indicated to be incorporated by reference.

The following appendix is further disclosed with respect to the embodiments.

(Appendix)

An information processing apparatus including a processor, and a memory that is incorporated in or connected to the processor, in which the processor is configured to, by operating a revolution mechanism that causes an imaging apparatus including a variable magnification mechanism to revolve, detect a subject image position of a target subject image showing a target subject in a captured image obtained by capturing an imaging region including the target subject by the imaging apparatus, and perform a registration control of setting the detected subject image position to a specific position in the captured image for a captured image obtained by imaging performed by the imaging apparatus in accordance with changing of magnification to a telephoto side by the variable magnification mechanism.

What is claimed is:

1. An imaging support device comprising:
a processor; and
a memory that is incorporated in or connected to the processor,
wherein the processor is configured to
by operating a revolution mechanism that causes an imaging apparatus including a variable magnification mechanism to revolve, detect a subject image position of a target subject image showing a target subject in a captured image obtained by capturing an imaging region including the target subject by the imaging apparatus,
perform a registration control of setting the detected subject image position to a specific position in the captured image, for the captured image obtained by imaging performed by the imaging apparatus in accordance with changing of magnification to a telephoto side by the variable magnification mechanism, and
store, in advance in the memory, information in which an offset amount to the specific position in the captured image calculated in accordance with changing of magnification to a telephoto side by the variable magnification mechanism and a revolution amount of the variable magnification mechanism for resolving the offset amount are associated with each other.

2. The imaging support device according to claim 1, wherein the imaging apparatus includes a shake correction component that corrects a shake occurring due to a vibration exerted on the imaging apparatus, and
the registration control is a control including a control of setting the subject image position detected by the processor to the specific position by operating the shake correction component.

3. The imaging support device according to claim 1, wherein the registration control is a control including a control of setting the subject image position detected by the processor to the specific position by operating the revolution mechanism.

4. The imaging support device according to claim 1, wherein the imaging apparatus includes a shake correction component that corrects a shake occurring due to a vibration exerted on the imaging apparatus, and
the processor is configured to perform the registration control by operating at least one of the shake correction component or the revolution mechanism in accordance with an offset amount of the detected subject image position with respect to the specific position.

5. The imaging support device according to claim 4, wherein the registration control includes a first registration control of moving the subject image position toward the specific position by operating the revolution mechanism and a second registration control of moving the subject image position toward the specific position by operating the shake correction component with higher registration accuracy than the first registration control, and
the processor is configured to perform the first registration control and then, perform the second registration control.

6. The imaging support device according to claim 4, wherein the processor is configured to, in a case where the subject image position deviates from the captured image by the changing of magnification to the telephoto side, move the subject image position toward the specific position by operating the revolution mechanism and move the subject image position toward the specific position by operating the shake correction component.

7. The imaging support device according to claim 1, wherein the processor is configured to perform the registration control in a case where at least a part of the target subject image deviates from the captured image by the changing of magnification to the telephoto side in a state where the target subject image is displayed in the captured image, and
the specific position is a position decided as a position at which the target subject image falls within the captured image.

8. The imaging support device according to claim 1, wherein an offset amount of the subject image position from the specific position in the captured image is increased due to a relative decrease in registration accuracy for an imaging range in a revolution angle of the revolution mechanism in accordance with the changing of magnification to the telephoto side by the variable magnification mechanism.

9. The imaging support device according to claim 1, wherein the processor is configured to perform the registration control by setting the specific position as a center position in the captured image.

10. The imaging support device according to claim 9, wherein variations in revolution angle of the revolution mechanism at a stoppage position in a case where the revolution of the imaging apparatus performed by the revolution mechanism is stopped are less than half of an angle of view of an imaging range on the telephoto side.

11. The imaging support device according to claim 10, wherein the variations are less than the half of the angle of view and are less than an offset amount of the subject image position with respect to the specific position.

12. An imaging support system comprising:
the imaging support device according to claim 1; and
the revolution mechanism,
wherein the imaging support device supports imaging performed by the imaging apparatus in a case where the revolution mechanism causes the imaging apparatus to revolve.

13. An imaging system comprising:
the imaging support device according to claim 1; and
the imaging apparatus,
wherein the imaging support device supports imaging for the imaging apparatus.

14. The imaging system according to claim 13, further comprising:
the revolution mechanism,
wherein the revolution mechanism causes the imaging apparatus to revolve.

15. An imaging support device comprising:
a processor; and
a memory that is incorporated in or connected to the processor,
wherein the processor is configured to
by operating a revolution mechanism that causes an imaging apparatus including a variable magnification mechanism and a shake correction component which corrects a shake occurring due to an exerted vibration to revolve, detect a subject image position of a target subject image showing a target subject in a captured image obtained by capturing an imaging region including the target subject by the imaging apparatus,
perform a registration control of setting the detected subject image position to a specific position in the captured image by operating at least one of the shake correction component or the revolution mechanism in accordance with an offset amount of the detected subject image position with respect to the specific position, for the captured image obtained by imaging performed by the imaging apparatus in accordance with changing of magnification to a telephoto side by the variable magnification mechanism, and
store, in advance in the memory, information in which an offset amount to the specific position in the captured image calculated in accordance with changing of magnification to a telephoto side by the variable magnification mechanism and a revolution amount of the variable magnification mechanism for resolving the offset amount are associated with each other.

16. An imaging support method comprising:
detecting, by operating a revolution mechanism that causes an imaging apparatus including a variable magnification mechanism to revolve, a subject image position of a target subject image showing a target subject in a captured image obtained by capturing an imaging region including the target subject by the imaging apparatus; and
performing a registration control of setting the detected subject image position to a specific position in the captured image, for the captured image obtained by imaging performed by the imaging apparatus in accordance with changing of magnification to a telephoto side by the variable magnification mechanism, and
wherein information, in which an offset amount to the specific position in the captured image calculated in accordance with changing of magnification to a telephoto side by the variable magnification mechanism and a revolution amount of the variable magnification mechanism for resolving the offset amount are associated with each other, is stored in advance.

17. A non-transitory recording medium recording a program causing a computer to execute a process comprising:
detecting, by operating a revolution mechanism that causes an imaging apparatus including a variable magnification mechanism to revolve, a subject image position of a target subject image showing a target subject in a captured image obtained by capturing an imaging region including the target subject by the imaging apparatus; and performing a registration control of setting the detected subject image position to a specific position in the captured image, for the captured image obtained by imaging performed by the imaging apparatus in accordance with changing of magnification to a telephoto side by the variable magnification mechanism, and wherein information, in which an offset amount to the specific position in the captured image calculated in accordance with changing of magnification to a telephoto side by the variable magnification mechanism and a revolution amount of the variable magnification mechanism for resolving the offset amount are associated with each other, is stored in advance.

\* \* \* \* \*